United States Patent
Morihara et al.

(10) Patent No.: US 10,367,425 B2
(45) Date of Patent: Jul. 30, 2019

(54) MATRIX CONVERTER

(71) Applicant: KABUSHIKI KAISHA YASKAWA DENKI, Kitakyushu-shi (JP)

(72) Inventors: Takayuki Morihara, Kitakyushu (JP); Takahiro Uchino, Kitakyushu (JP); Masahiro Tsuruta, Kitakyushu (JP); Shigekatsu Nagatomo, Kitakyushu (JP); Yuto Kubo, Kitakyushu (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 0 days.

(21) Appl. No.: 15/343,212

(22) Filed: Nov. 4, 2016

(65) Prior Publication Data
US 2017/0077828 A1 Mar. 16, 2017

Related U.S. Application Data

(63) Continuation of application No. PCT/JP2014/066331, filed on Jun. 19, 2014.

(51) Int. Cl.
*H02M 5/29* (2006.01)
*H02M 5/293* (2006.01)
*H02M 5/297* (2006.01)

(52) U.S. Cl.
CPC .......... *H02M 5/293* (2013.01); *H02M 5/297* (2013.01)

(58) Field of Classification Search
CPC ...... H02M 5/293; H02M 5/297; H02M 5/271; H02M 5/27; H02M 2001/0045
See application file for complete search history.

(56) References Cited

U.S. PATENT DOCUMENTS

| | | | | |
|---|---|---|---|---|
| 6,301,130 B1 * | 10/2001 | Aiello | ...................... | H02M 7/49 363/37 |
| 6,351,397 B1 * | 2/2002 | Sawa | ...................... | H02M 5/271 323/207 |
| 9,723,741 B2 * | 8/2017 | Dilley | ...................... | H05K 7/026 |
| 2009/0059633 A1 * | 3/2009 | Hara | ...................... | H02M 5/293 363/126 |

(Continued)

FOREIGN PATENT DOCUMENTS

| | | |
|---|---|---|
| CN | 102340247 | 2/2012 |
| CN | 102790043 | 11/2012 |

(Continued)

OTHER PUBLICATIONS

Chinese Office Action for corresponding CN Application No. 201480079695.5, dated Jul. 20, 2018.

(Continued)

*Primary Examiner* — Binh B Tran
*Assistant Examiner* — Douglas R Burtner
(74) *Attorney, Agent, or Firm* — Mori & Ward, LLP

(57) ABSTRACT

A matrix converter includes a plurality of first bidirectional switches electrically connected to each of input phases of an AC power supply and each of output phases of a load, respectively, and a plurality of second bidirectional switches electrically connected to each of the input phases and each of the output phases, respectively. The first bidirectional switch and the second bidirectional switch are electrically connected in parallel to one of the input phases and one of the output phases.

18 Claims, 16 Drawing Sheets

(56) References Cited

U.S. PATENT DOCUMENTS

| | | | |
|---|---|---|---|
| 2010/0246217 A1* | 9/2010 | Sakakibara | H02M 1/32 363/37 |
| 2010/0327799 A1* | 12/2010 | Broussard | H02M 7/003 318/807 |
| 2011/0132899 A1* | 6/2011 | Shimomugi | H02M 3/1584 219/620 |
| 2012/0019970 A1 | 1/2012 | Nagano et al. | |
| 2012/0020021 A1* | 1/2012 | Kishimoto | H02M 5/271 361/695 |
| 2012/0230067 A1* | 9/2012 | Yamanaka | H02M 5/293 363/37 |
| 2012/0307531 A1* | 12/2012 | Toliyat | H02M 5/4585 363/36 |
| 2013/0021759 A1 | 1/2013 | Zschieschang et al. | |
| 2013/0222967 A1 | 8/2013 | Imamura et al. | |
| 2014/0035289 A1* | 2/2014 | Eichler | H05K 7/1432 290/55 |
| 2014/0185326 A1* | 7/2014 | Koyano | H02M 5/293 363/2 |
| 2014/0246913 A1* | 9/2014 | Heerdt | H02M 7/49 307/80 |
| 2014/0247636 A1* | 9/2014 | Koyano | H02M 5/297 363/148 |
| 2014/0266017 A1 | 9/2014 | Hamada et al. | |
| 2015/0195928 A1 | 7/2015 | Zschieschang et al. | |
| 2015/0342076 A1* | 11/2015 | Dilley | H05K 7/026 361/730 |

FOREIGN PATENT DOCUMENTS

| | | |
|---|---|---|
| JP | 2005-237138 | 9/2005 |
| JP | 2006-333590 | 12/2006 |
| JP | 2007043795 A * | 2/2007 |
| JP | 2007043795 A * | 2/2007 |
| JP | 2011-120376 | 6/2011 |
| JP | 2012-029372 | 2/2012 |
| JP | 2012-029373 | 2/2012 |
| JP | 2013-085369 | 5/2013 |
| JP | 2013-115907 | 6/2013 |

OTHER PUBLICATIONS

Chinese Office Action for corresponding CN Application No. 201480079695.5, dated Apr. 28, 2018.

Chinese Office Action for corresponding CN Application No. 201710821078.3, dated Jan. 24, 2019 (w/ English machine translation).

Chinese Office Action for corresponding CN Application No. 201480079695.5, dated Jan. 14, 2019.

Japanese Office Action for corresponding JP Application No. 2016-528731, dated Sep. 5, 2016 w/ English machine translation.

International Search Report for corresponding International Application No. PCT/JP2014/066331, dated Sep. 9, 2014.

Written Opinion for corresponding International Application No. PCT/JP2014/066331, dated Sep. 9, 2014.

International Preliminary Report on Patentability with Translation of Written Opinion of the International Searching Authority for corresponding International Application No. PCT/JP2014/066331, dated Dec. 29, 2016.

* cited by examiner

[FIG. 1]
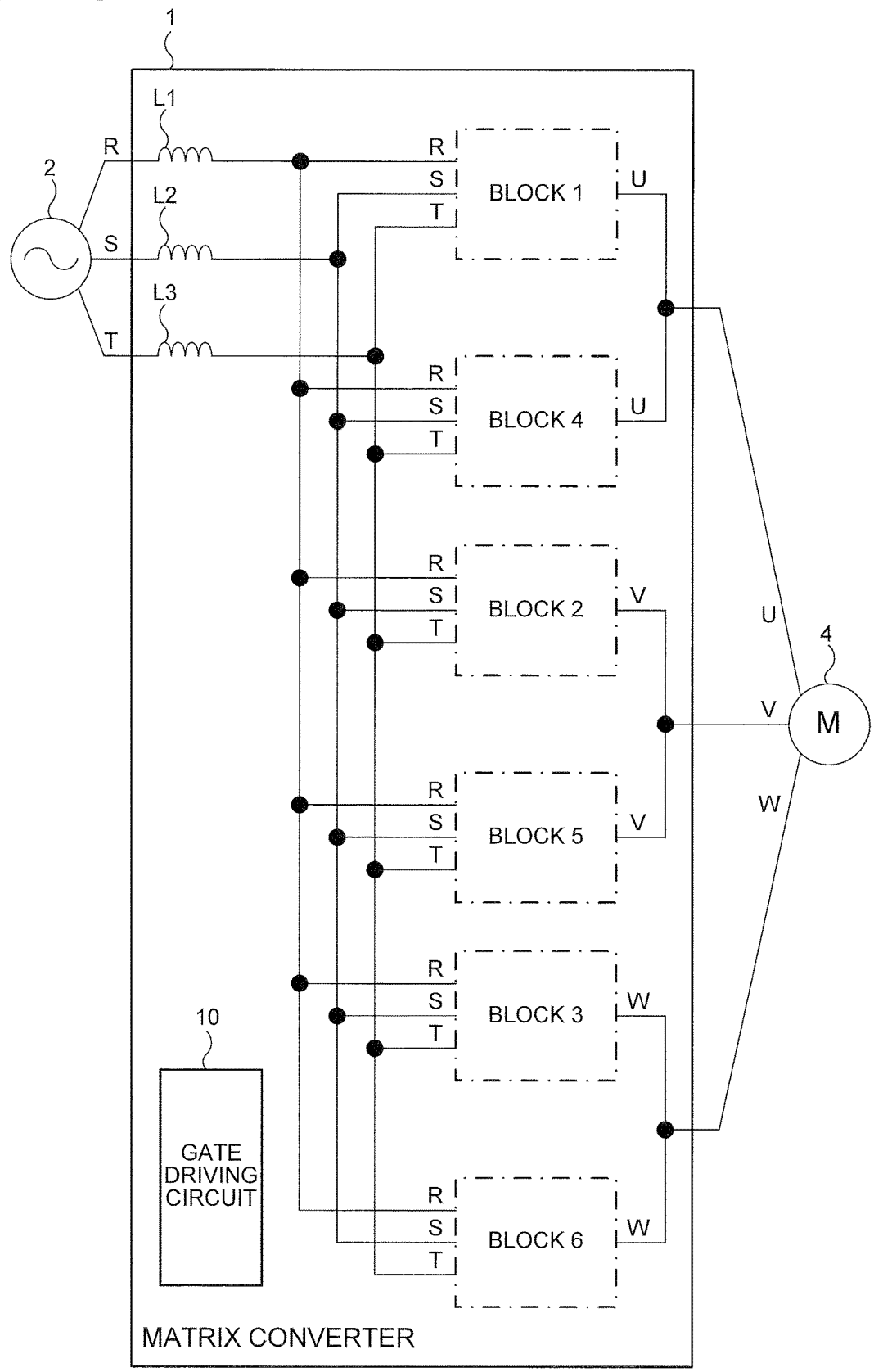

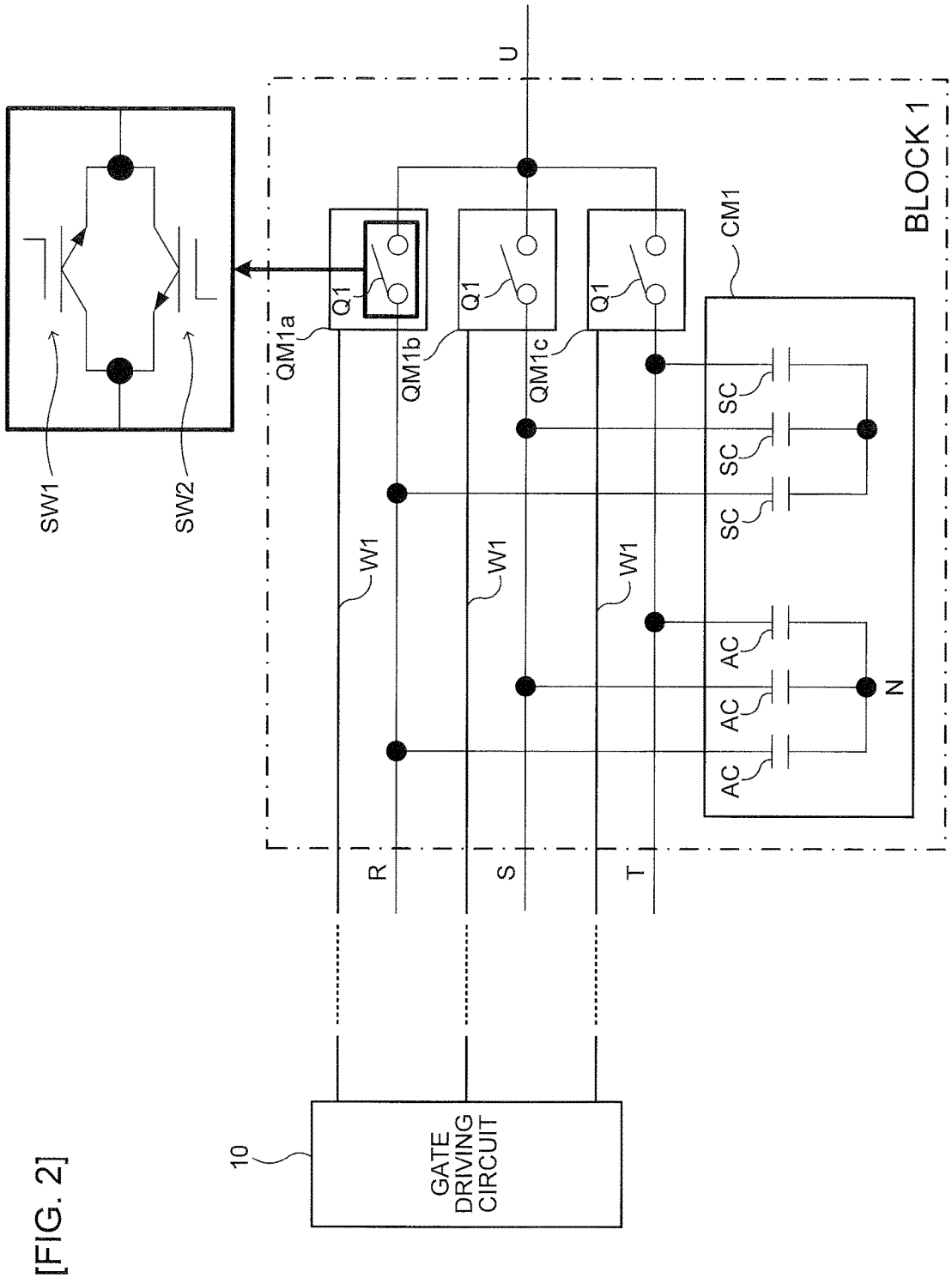
[FIG. 2]

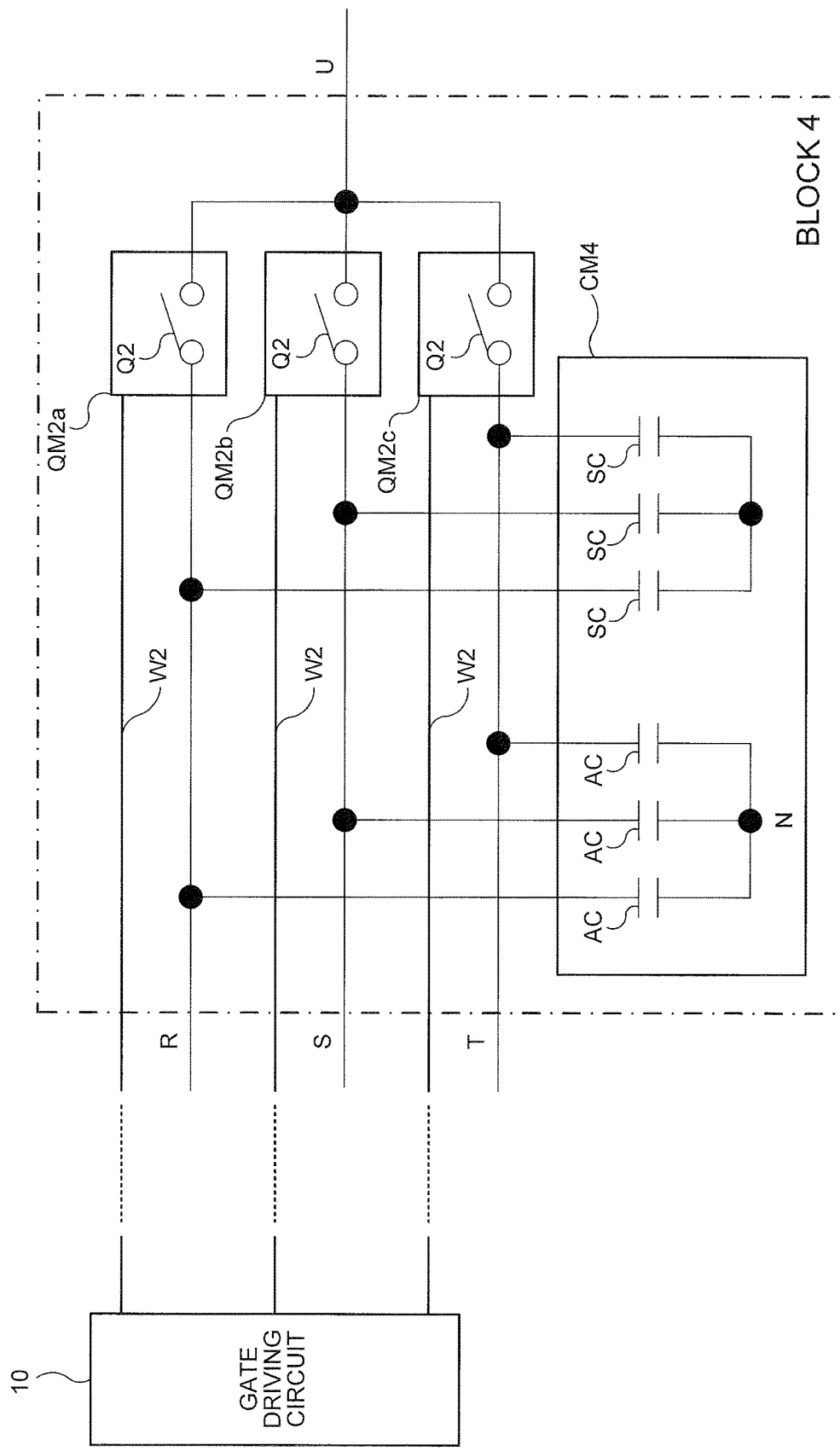
[FIG. 3]

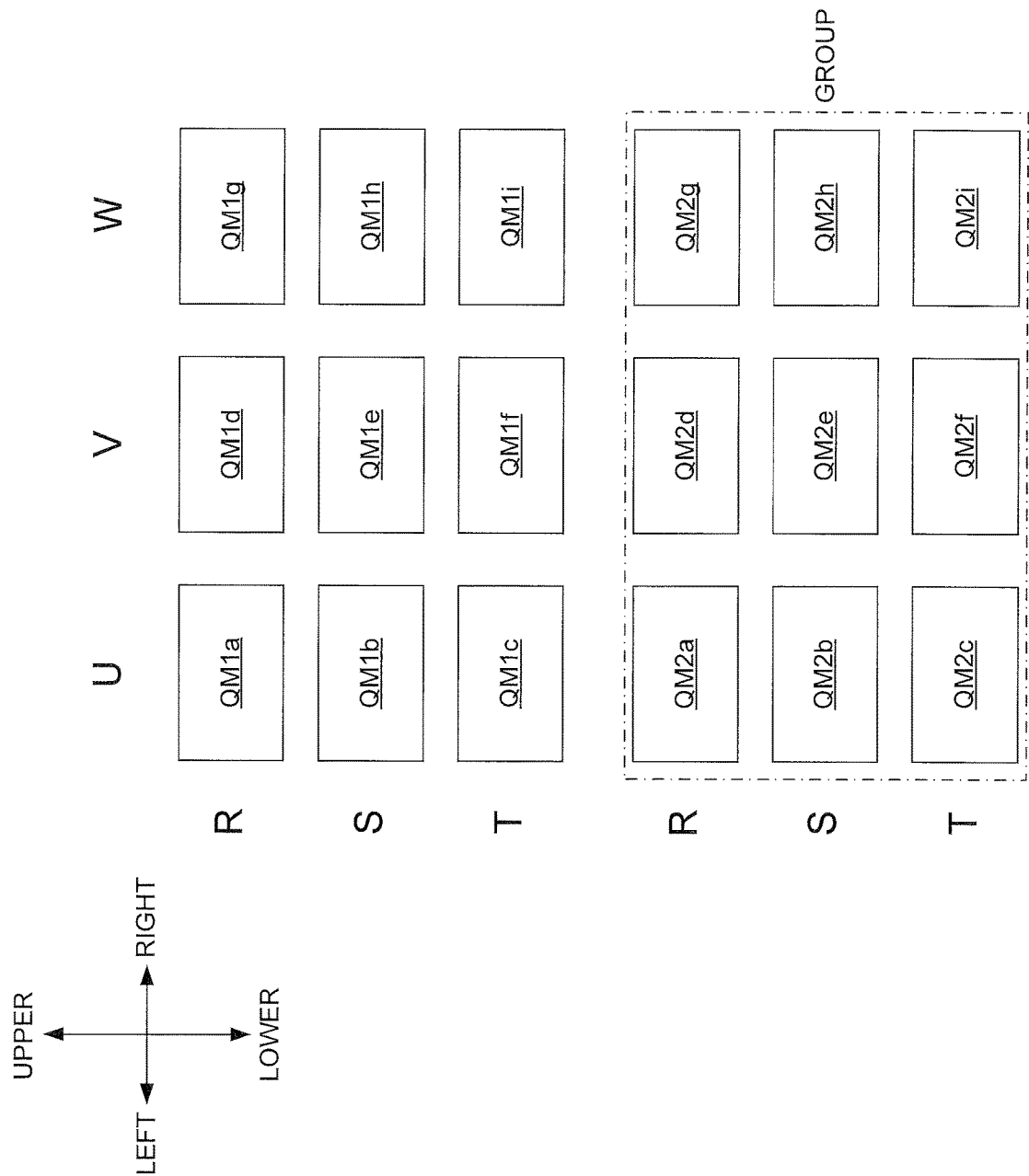
[FIG. 4]

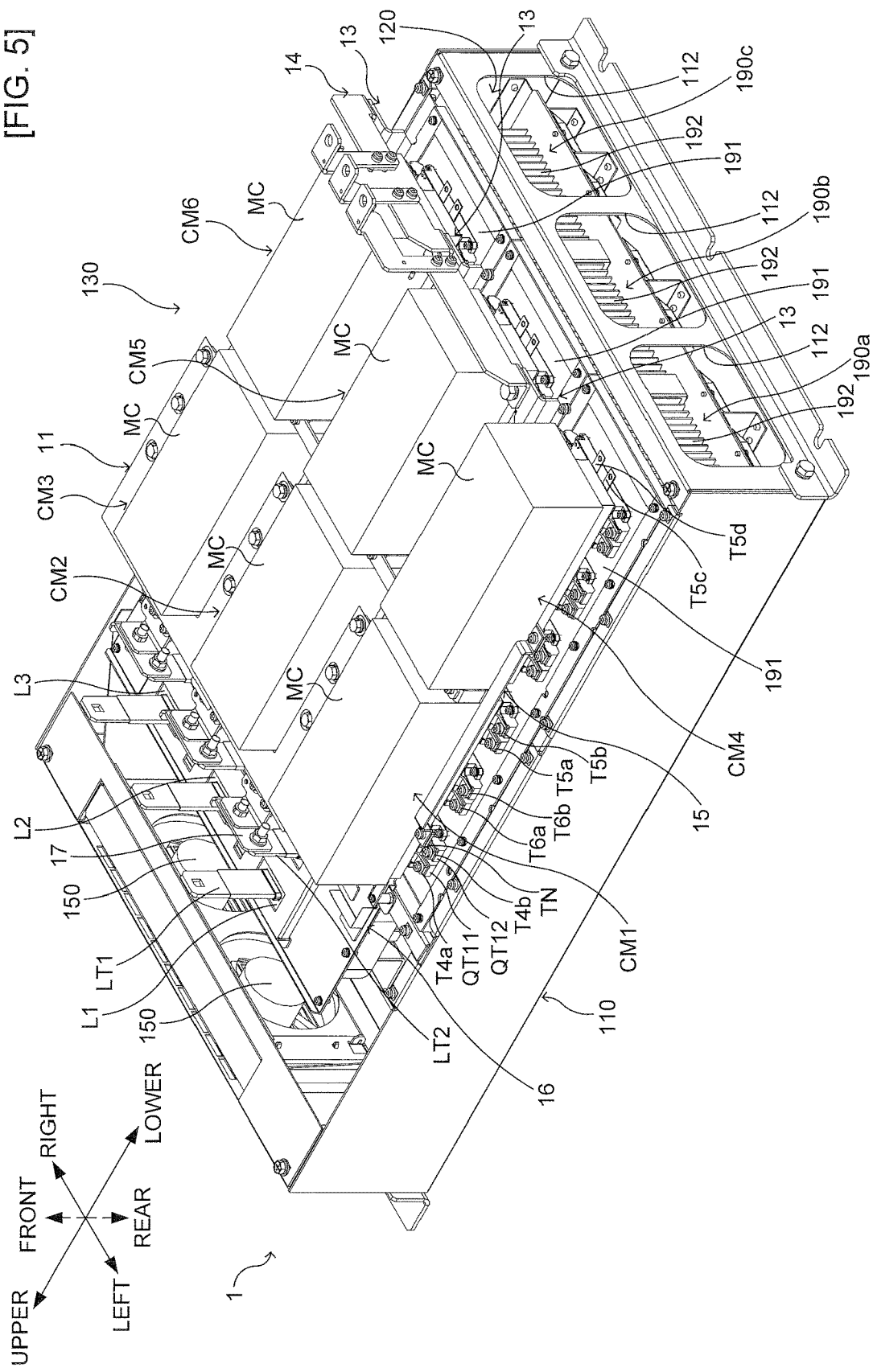
[FIG. 5]

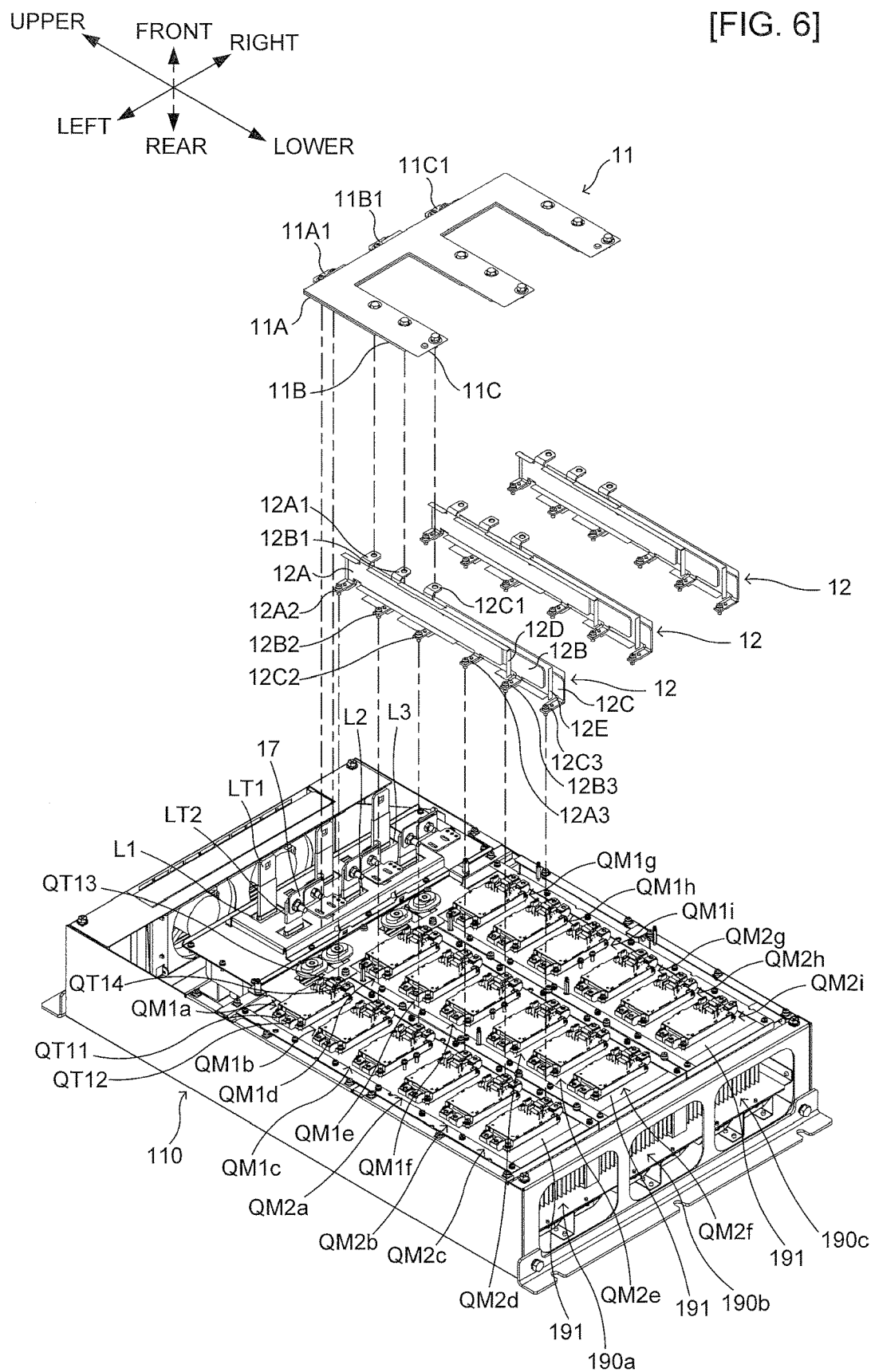
[FIG. 6]

[FIG. 7]
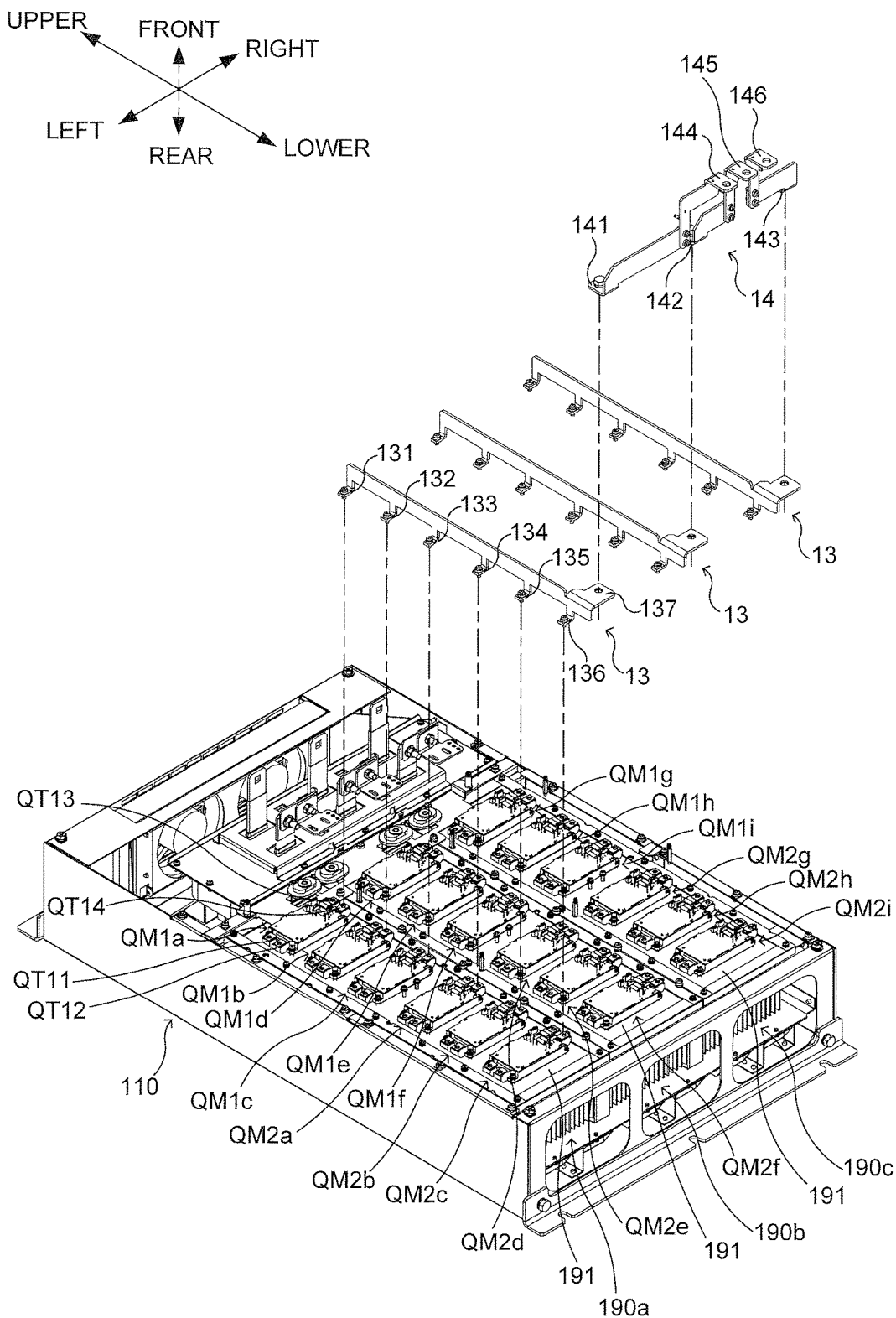

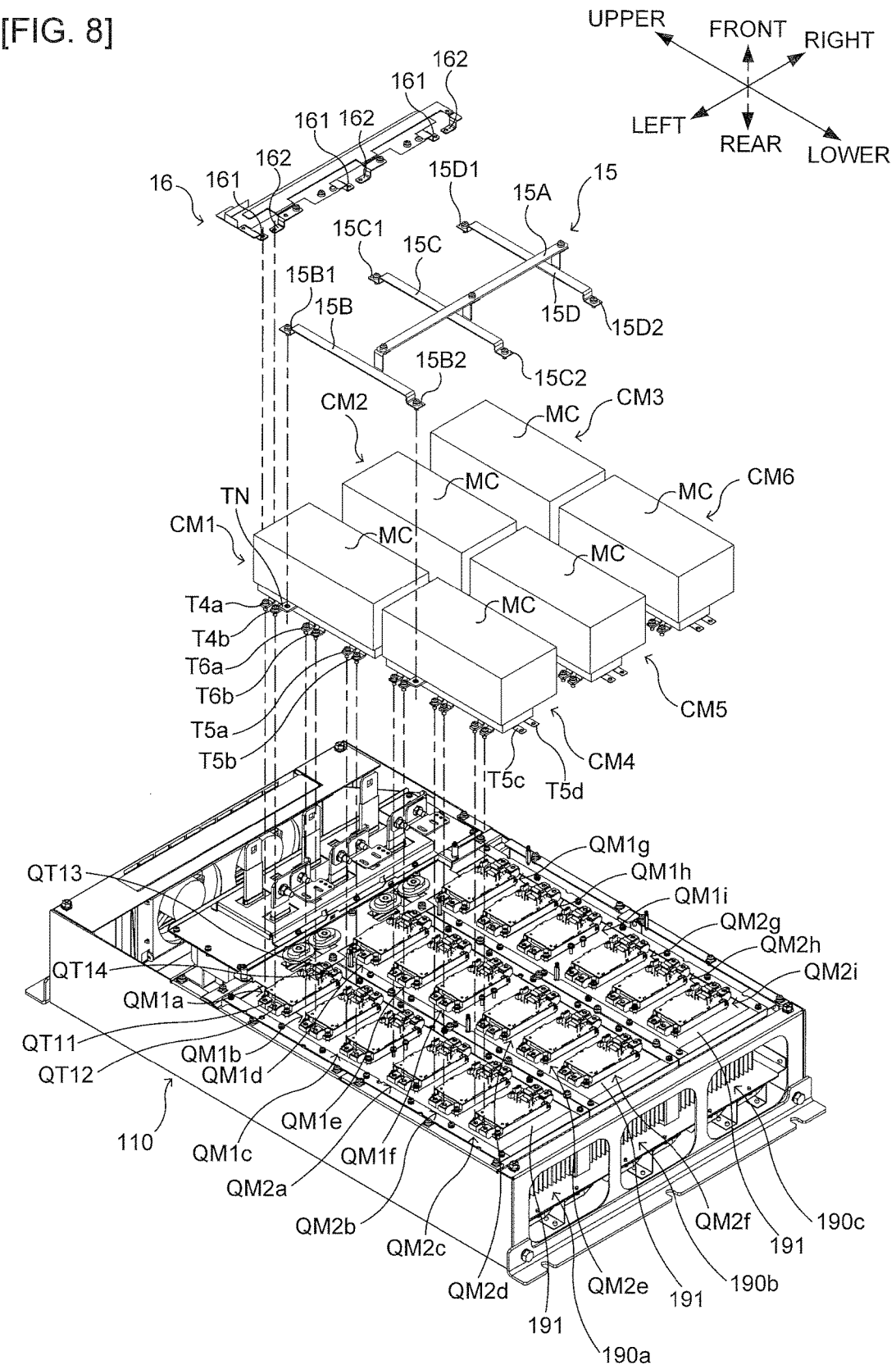

[FIG. 9A]
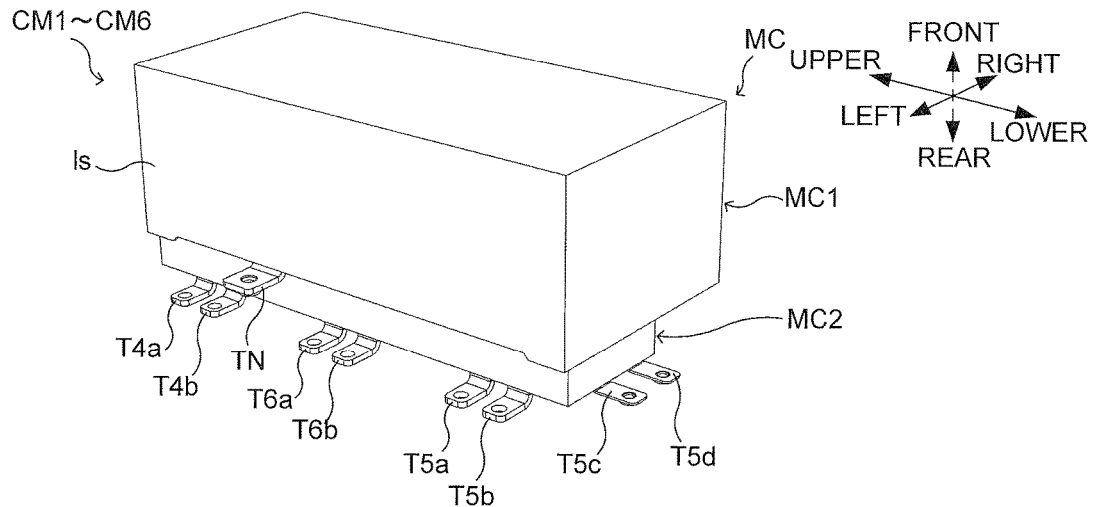
[FIG. 9B]
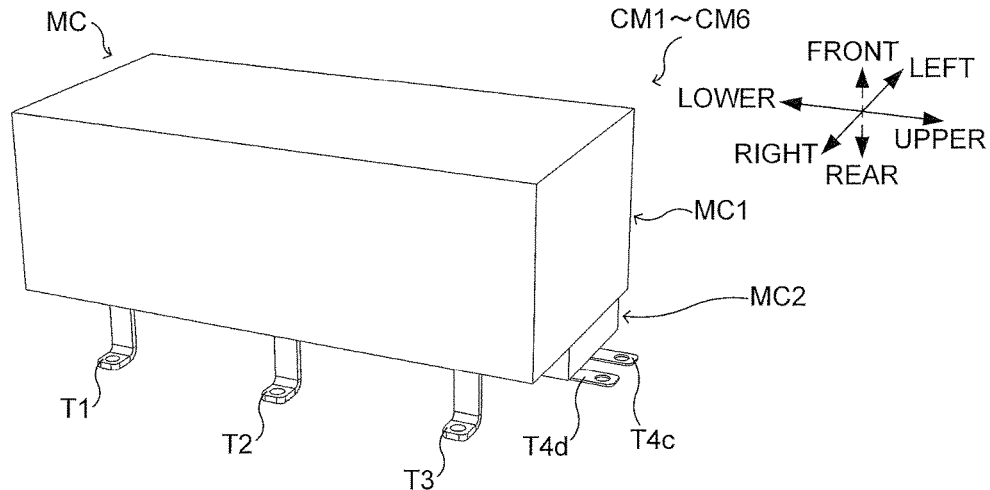
[FIG. 9C]
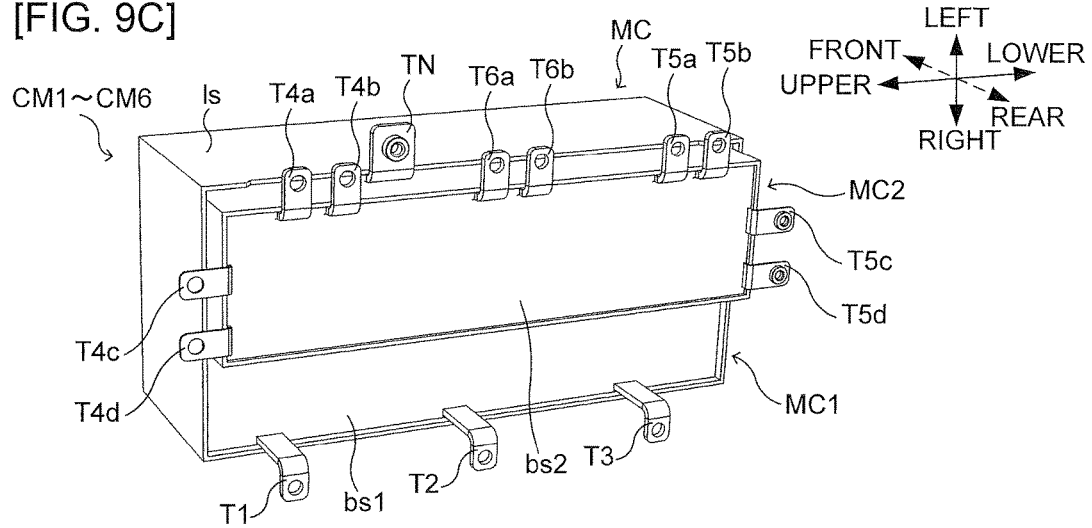

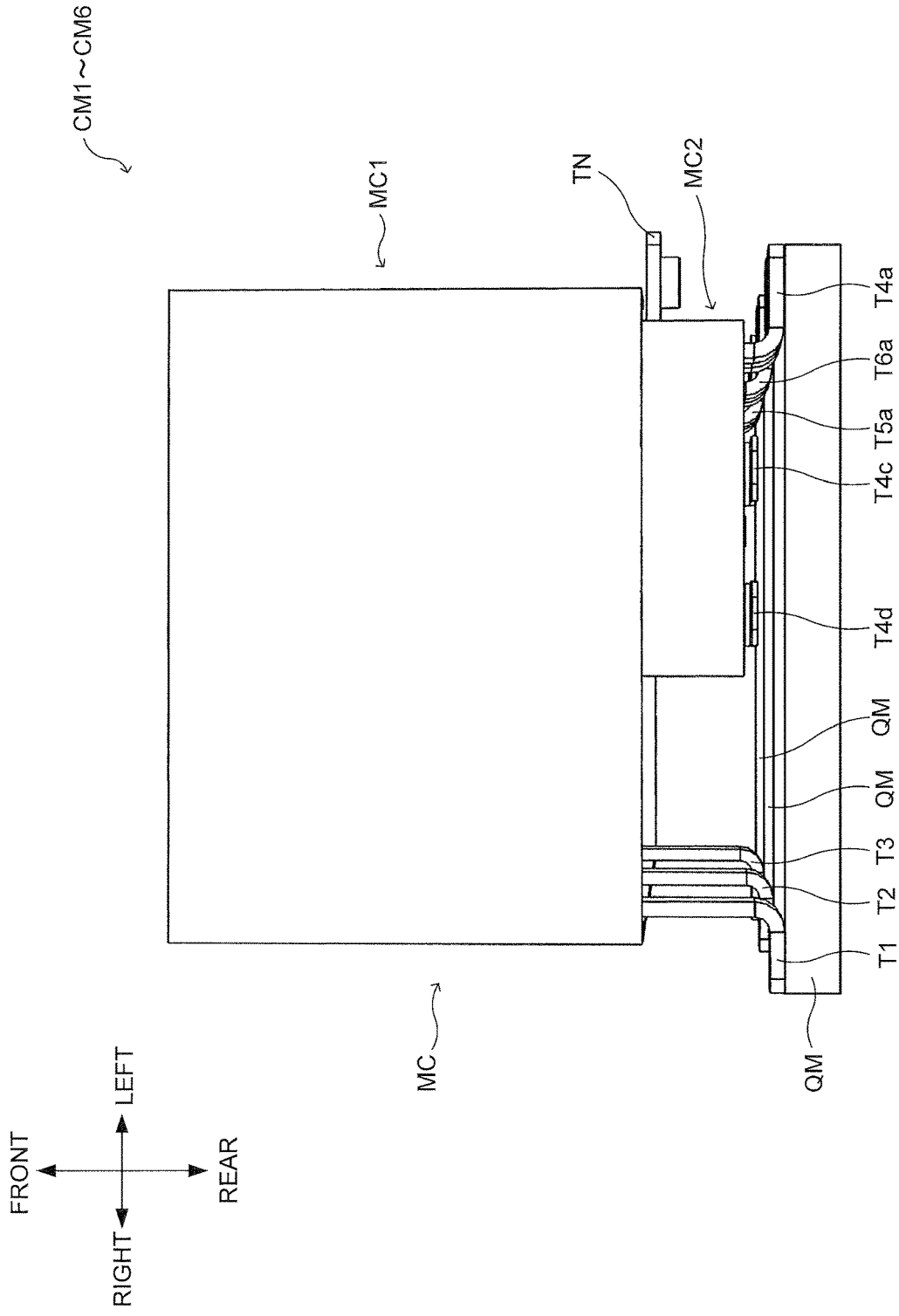
[FIG. 10]

[FIG. 11]
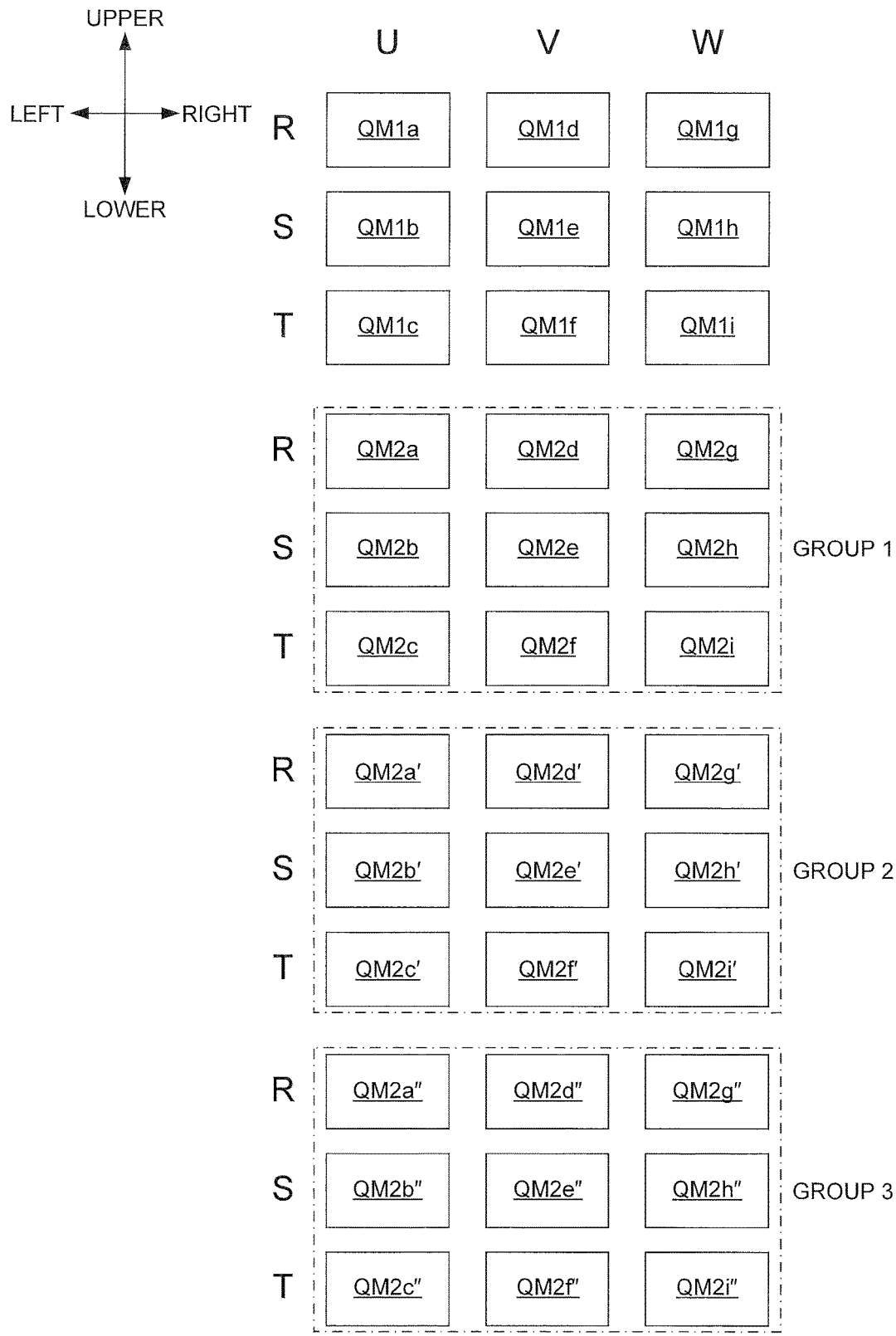

[FIG. 12]
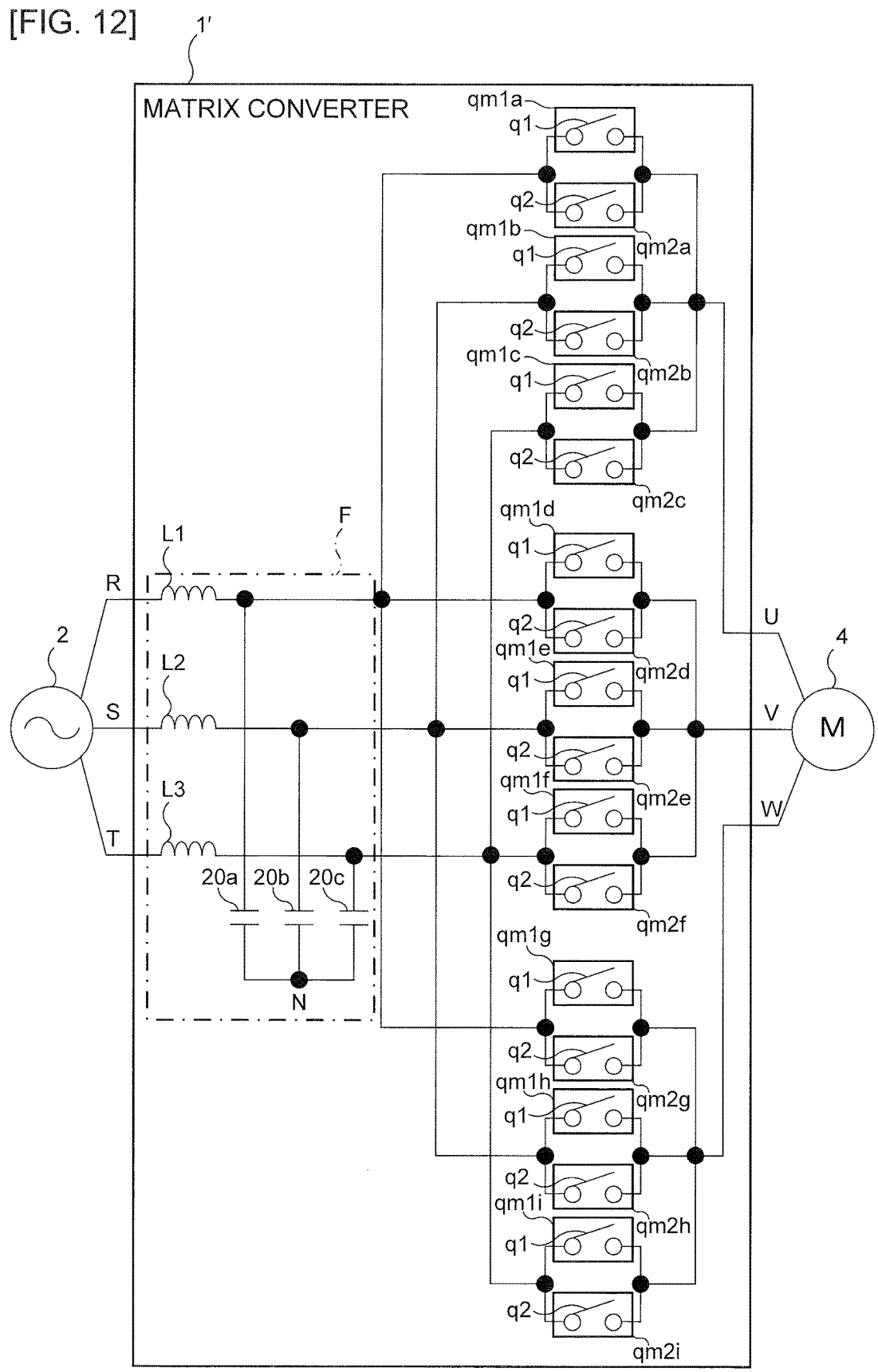

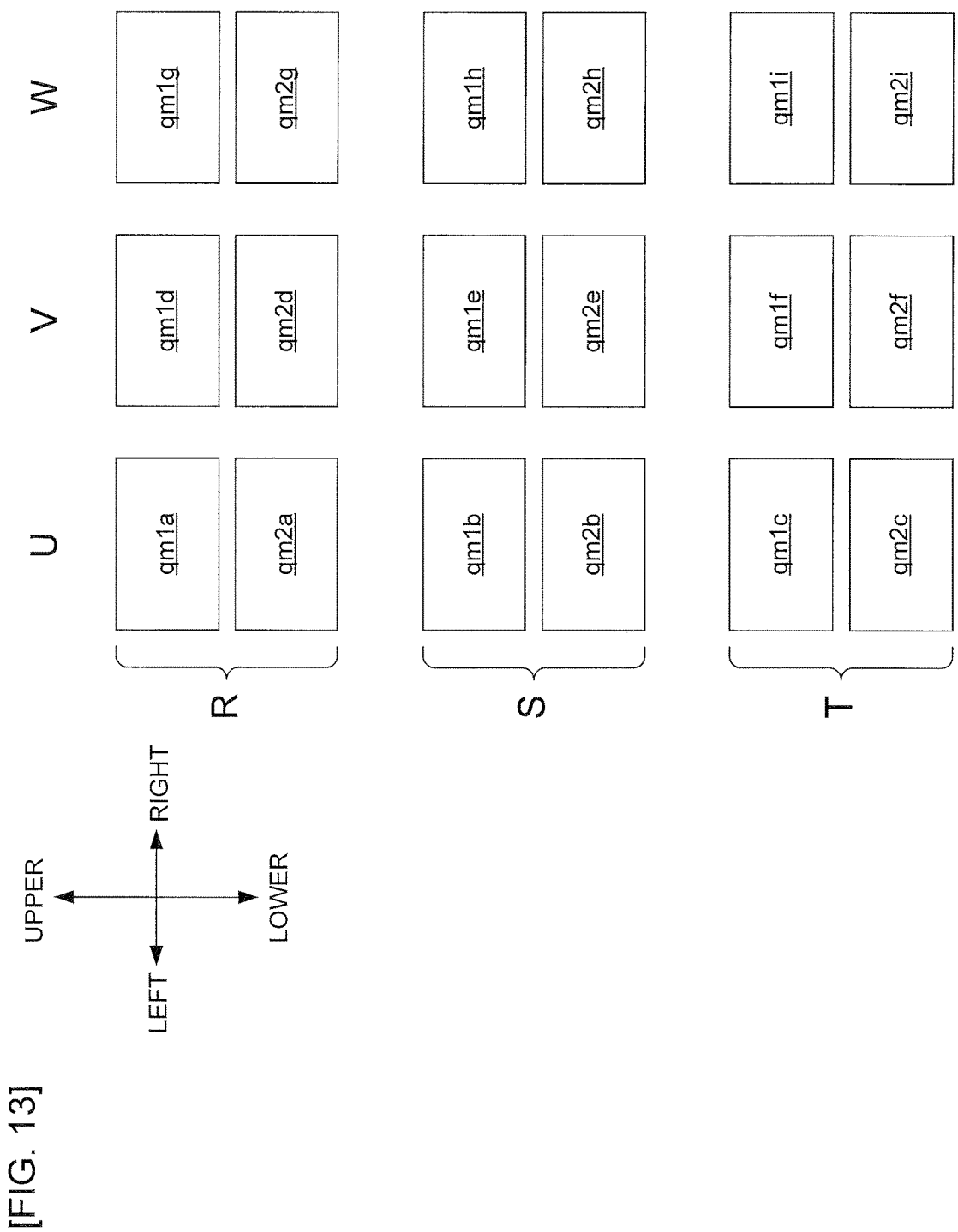
[FIG. 13]

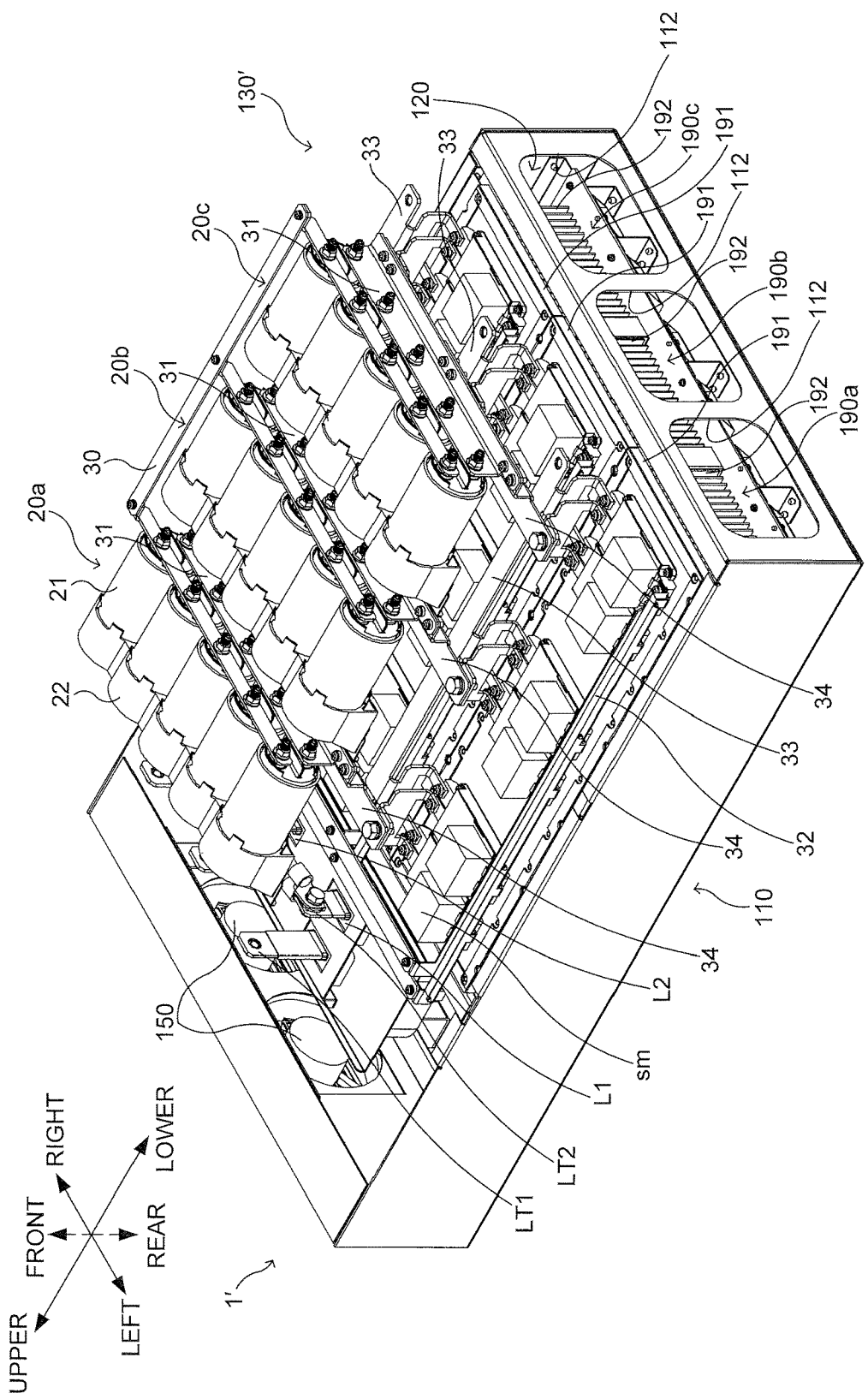
[FIG. 14]

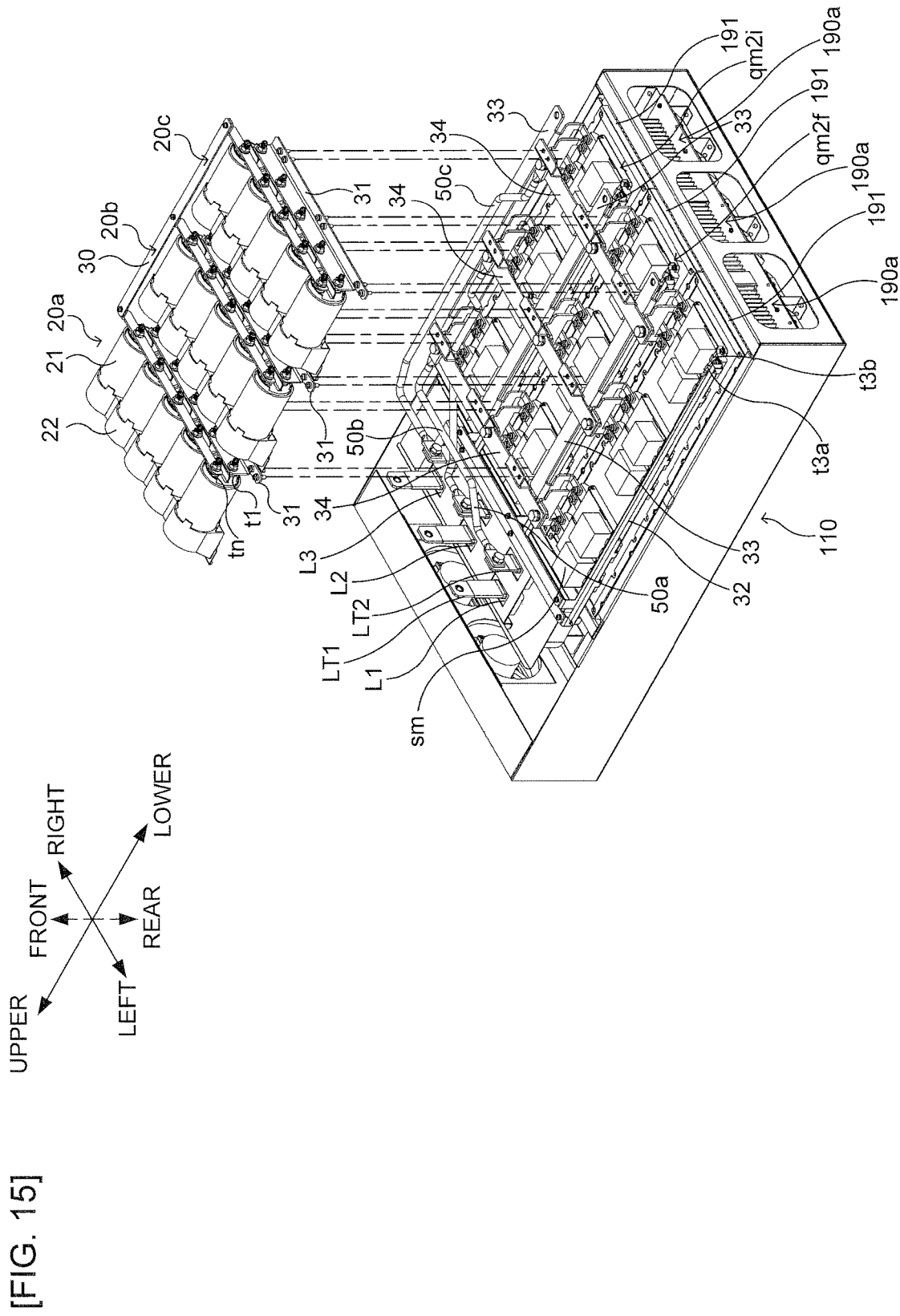
[FIG. 15]

[FIG. 16]
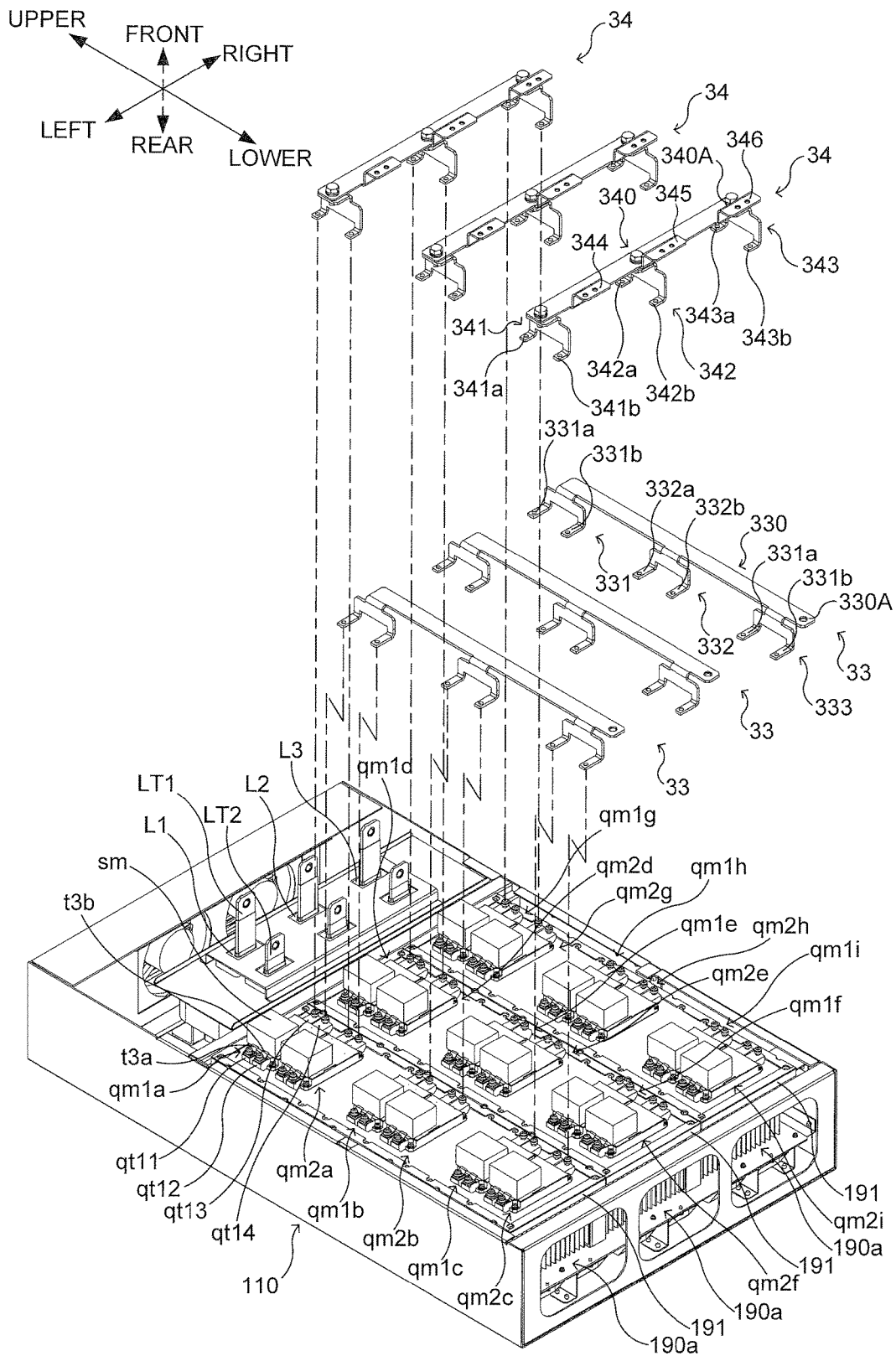

MATRIX CONVERTER

CROSS-REFERENCE TO RELATED APPLICATION

This is a continuation application of PCT/JP2014/066331, filed Jun. 19, 2014, which was published under PCT article 21(2). The entire contents of this application are incorporated herein by reference.

BACKGROUND

Technical Field

Disclosed embodiments relate to a matrix converter.

Description of Background Art

A matrix converter, which includes a plurality of semiconductor switch modules each having a semiconductor bidirectional switch, and a plurality of snubber modules each having a plurality of capacitors and a plurality of diodes for suppressing the surge voltage generated by switching of the semiconductor bidirectional switch, is known.

SUMMARY

According to one aspect of the present disclosure, a matrix converter includes a plurality of first bidirectional switches electrically connected to each of input phases of an AC power supply and each of output phases of a load, respectively, and a plurality of second bidirectional switches electrically connected to each of the input phases and each of the output phases, respectively. The first bidirectional switch and the second bidirectional switch are electrically connected in parallel to one of the input phases and one of the output phases.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a circuit configuration diagram representing a circuit configuration of a matrix converter according to a first embodiment;

FIG. 2 is a circuit configuration diagram representing the circuit configuration at a position on the circuit, corresponding to "BLOCK1" in FIG. 1;

FIG. 3 is a circuit configuration diagram representing the circuit configuration at the position on the circuit, corresponding to "BLOCK4" in FIG. 1;

FIG. 4 is a conceptual diagram schematically representing an arrangement structure of switch modules;

FIG. 5 is a perspective view of a specific structure of the matrix converter in a state where a main body case is omitted;

FIG. 6 is an exploded perspective view representing the specific structure of the matrix converter in a state where capacitor modules and a part of bus bars are omitted from the state as shown in FIG. 5;

FIG. 7 is an exploded perspective view representing the specific structure of the matrix converter in the state where the capacitor modules and the part of the bus bars are omitted from the state as shown in FIG. 5;

FIG. 8 is an exploded perspective view representing the specific structure of the matrix converter in the state where the part of the bus bars are omitted from the state as shown in FIG. 5;

FIG. 9A is a perspective view representing a structure of the capacitor module;

FIG. 9B is a perspective view representing the structure of the capacitor module;

FIG. 9C is a perspective view representing the structure of the capacitor module;

FIG. 10 is a schematic view illustrating the capacitor module in a self-standing state;

FIG. 11 is a conceptual diagram representing another arrangement structure example of the switch modules;

FIG. 12 is a circuit configuration diagram representing the circuit configuration of the matrix converter according to a second embodiment;

FIG. 13 is a conceptual diagram representing the arrangement structure of the switch modules;

FIG. 14 is a perspective view representing a specific structure of the matrix converter in the state where the main body case is omitted;

FIG. 15 is an exploded perspective view representing the specific structure of the matrix converter in the state where the main body case is omitted; and FIG. 16 is an exploded perspective view representing the specific structure of the matrix converter in the state where the capacitor section, a part of the bus bars, and the cable are omitted from the state as shown in FIG. 15.

DETAILED DESCRIPTION OF THE EMBODIMENTS

Hereinafter, embodiments will be described in detail referring to the drawings. Note that the terms noted in the drawings, that is, "front", "rear", "left", "right", "upper" and "lower" denote the respective directions to be described correspondingly in the specification. However, it is to be noted that the positional relationships among the respective components of the matrix converter of the embodiments will be arbitrarily expressed without being limited to those specified as "front", "rear", "left", "right", "upper" and "lower".

<First Embodiment>

Firstly, a first embodiment will be described.

(Circuit Configuration of Matrix Converter)

First, referring to FIGS. 1, 2, and 3, the circuit configuration of the matrix converter of the present embodiment will be described.

As FIGS. 1 to 3 show, a matrix converter 1 is a power converter configured to directly convert AC power input from an AC power supply 2 into AC power at arbitrary voltage/frequency so as to output the AC power to a load 4 (AC motor in this example).

The number of input phases of the AC power supply 2 in the matrix converter 1 is not specifically limited, but the present embodiment will be described with respect to the case where the number of input phases is three (R-phase, S-phase, T-phase). That is, the AC power supply 2 is a three-phase AC power supply. Further, the number of output phases of the load 4 in the matrix converter 1 is not specifically limited, but the present embodiment will be described with respect to the case where the number of output phases is three (U-phase, V-phase, W-phase). That is, the load 4 is a three-phase AC load (three-phase AC motor in this example). Furthermore, the load 4 is not limited to the AC motor, but may be an arbitrary electronic device so long as it is operable with the AC power input from the matrix converter 1.

The matrix converter 1 includes three AC reactors L1, L2, L3, a plurality of first bidirectional switches Q1, a plurality of second bidirectional switches Q2, a plurality of AC capacitors AC, a plurality of snubber capacitors SC, and a gate driving circuit 10.

In the present embodiment, nine first bidirectional switches Q1 are provided, and one group of second bidirectional switches Q2 in the number equal to that of the first bidirectional switches Q1 are provided, that is, with nine switches as one group. In the following, appropriately, the first and second bidirectional switches Q1 and Q2 will be simply referred to as "bidirectional switches Q" in the case of requiring no distinguishment. Further, the AC capacitors AC and the snubber capacitors SC are each provided in the number equal to that of the bidirectional switches Q, that is, eighteen. FIG. 1 omits the bidirectional switches Q, the AC capacitors AC, and the snubber capacitors SC to avoid cumbersome illustration. The respective circuit positions corresponding to those elements will be conceptually illustrated as "BLOCK".

The AC reactors L1, L2, L3 are connected to the R-phase, the S-phase, the T-phase of the AC power supply 2, respectively. In the following, appropriately, the AC reactors L1, L2, L3 will be simply referred to as "AC reactors L" hereinafter in the case of requiring no distinguishment. The power line will be branched into 6 lines at each output side of the AC reactors L1-L3. In the following, appropriately, each of the power lines divided at the output side of the AC reactor L will be referred to as "branched power line".

Each of the nine first bidirectional switches Q1 includes two switch sections SW1, SW2 (IGBT in this example) which are electrically connected in parallel in mutually reverse directions (see partially enlarged view of FIG. 2). Here, the switch sections SW1, SW2 may be arbitrarily configured without being limited to the IGBT so long as such section includes the device capable of switching control (ON/OFF control) by using the gate driving circuit 10, for example, such as MOSFET or GTO. Further, the structure of the first bidirectional switch Q1 may be arbitrarily configured with no limitation to the structure including two switch sections SW1, SW2. Each of those nine first bidirectional switches Q1 is connected to any of the R-phase, S-phase, T-phase at an output side of any of the AC reactors L1-L3, and further connected to any of the U-phase, V-phase and W-phase of the load 4. Namely, the nine first bidirectional switches Q1 will be divided into three groups, with three switches as one group. The three first bidirectional switches Q1 related to each group are respectively connected to the R-phase, S-phase, T-phase at the output side of the AC reactors L1-L3, and electrically connected in parallel to the same output phase of the load 4. At this time, each of the groups has a different output phase to which the first bidirectional switch Q1 is connected.

That is, the three groups related to the first bidirectional switches Q1 are arranged at positions of "BLOCK1", "BLOCK2", "BLOCK3" on the circuit, respectively. As FIG. 2 shows, in the "BLOCK1", the three first bidirectional switches Q1 which are modularized as first switch modules QM1a, QM1b, QM1c are respectively connected to the R-phase, S-phase, and T-phase, and electrically connected in parallel to the U-phase. Further, although not specifically shown, in the "BLOCK2", the three first bidirectional switches Q1 which are modularized as the first switch modules QM1d, QM1e, QM1f are respectively connected to the corresponding R-phase, S-phase, T-phase, and electrically connected in parallel to the V-phase. Furthermore, although not specifically shown, on the "BLOCK3", the three first bidirectional switches Q1 which are modularized as the first switch modules QM1g, QM1h, QM1i (see FIG. 4 to be described later) are respectively connected to the R-phase, S-phase, and T-phase, and electrically connected in parallel to the W-phase. In the following, appropriately, the first switch modules QM1a-QM1i will be simply referred to as "first switch modules QM1" in the case of requiring no distinguishment.

Each of nine second bidirectional switches Q2 is configured likewise the first bidirectional switch Q1. Each of the nine second bidirectional switches Q2 is connected to any of the R-phase, S-phase, T-phase at an output side of any of the AC reactors L1-L3, and further connected to any of the U-phase, V-phase, W-phase of the load 4. At this time, each of the nine second bidirectional switches Q2 is electrically connected to the same input phase as that to which the first bidirectional switch Q1 is connected, in parallel with the first bidirectional switch Q1, and further electrically connected to the same output phase as that to which the first bidirectional switch Q1 is connected, in parallel with the first bidirectional switch Q1. In other words, the nine second bidirectional switches Q2 are divided into three groups, with the three switches as one group. The three second bidirectional switches Q2 related to each group are respectively connected to the R-phase, S-phase, T-phase at the respective output sides of the AC reactors L1-L3, and electrically connected in parallel to the same output phase of the load 4. At this time, each of the groups has a different output phase to which the second bidirectional switch Q1 is connected.

That is, the three groups related to the second bidirectional switches Q2 are arranged at positions of "BLOCK4", "BLOCK5", "BLOCK6" on the circuit, respectively. As FIG. 3 shows, in the "BLOCK4", the three second bidirectional switches Q2 which are modularized as second switch modules QM2a, QM2b, QM2c are respectively connected to the R-phase, S-phase, T-phase, and electrically connected in parallel to the U-phase. Further, although not specifically shown, in the "BLOCK5", the three second bidirectional switches Q2 which are modularized as the second switch modules QM2d, QM2e, QM2f are respectively connected to the R-phase, S-phase, T-phase, and electrically connected in parallel to the V-phase. Furthermore, although not specifically shown, in the "BLOCK6", the three second bidirectional switches Q2 which are modularized as the second switch modules QM2g, QM2h, QM2i (see FIG. 4 to be described later) are connected to the R-phase, S-phase, T-phase, and further electrically connected in parallel to the W-phase. In the following, appropriately, the second switch modules QM2a-QM2i will be simply referred to as "second switch modules QM2" in the case of requiring no distinguishment. In the following, appropriately, the first switch module QM1 and the second switch module QM2 will be simply referred to as "switch modules QM" in the case of requiring no distinguishment.

Each of eighteen AC capacitors AC includes a plurality of AC capacitors (not shown) electrically connected in parallel. Those eighteen AC capacitors AC are divided into six groups, with three AC capacitors as one group. The three AC capacitors AC related to each group are branched at each output side of the AC reactors L1-L3, and respectively connected to the R-phase, S-phase, T-phase (star connection, for example) on three branched power lines respectively connected to the three bidirectional switches Q related to the same group.

Eighteen snubber capacitors SC are divided into six groups, with three snubber capacitors as one group. The three snubber capacitors SC related to each group are respectively branched at each output side of the AC reactors L1-L3, and respectively connected to the R-phase, S-phase, T-phase on three branched power lines respectively connected to the three bidirectional switches Q related to the same group.

In other words, the six groups related to the AC capacitors AC and the six groups related to the snubber capacitors SC are arranged in the "BLOCK1"-"BLOCK6" on the circuit, respectively.

In the positions of "BLOCK1"-"BLOCK3", three AC capacitors AC are connected to the R-phase, S-phase, T-phase, and three snubber capacitors SC are connected to the R-phase, S-phase, T-phase, respectively, on the three branched power lines to which the three first bidirectional switches Q1 arranged on the circuit shown at the "BLOCK" are connected respectively (see FIG. 2). At this time, as shown in FIG. 2, the three AC capacitors AC and the three snubber capacitors SC in the "BLOCK1" are modularized as a capacitor module CM1 (see FIG. 5 to be described later). Further, although not specifically shown, the three AC capacitors AC and the three snubber capacitors SC in the "BLOCK2" are modularized as a capacitor module CM2 (see FIG. 5 to be described later). Furthermore, although not specifically shown, the three AC capacitors AC and the three snubber capacitors SC in the "BLOCK3" are modularized as a capacitor module CM3 (see FIG. 5 to be described later).

In the "BLOCK4"-"BLOCK6", three AC capacitors AC are respectively connected to the R-phase, S-phase, T-phase, and three snubber capacitors SC are respectively connected to the R-phase, S-phase, T-phase on the three branched power lines to which the three second bidirectional switches Q2 on the corresponding circuit at the "BLOCK" are connected respectively (see FIG. 3). At this time, as shown in FIG. 3, the three AC capacitors AC and the three snubber capacitors SC in the "BLOCK4" are modularized as a capacitor module CM4 (see also FIG. 5 to be described later). Further, although not specifically shown, the three AC capacitors AC and the three snubber capacitors SC in the "BLOCK5" are modularized as a capacitor module CM5 (see FIG. 5 to be described later). Furthermore, although not specifically shown, the three AC capacitors AC and the three snubber capacitors SC in the "BLOCK6" are modularized as a capacitor module CM6 (see FIG. 5 to be described later). In the following, appropriately, the capacitor modules CM1-CM6 will be simply referred to as "capacitor modules CM" in the case of requiring no distinguishment.

The gate driving circuit 10 is connected to each of the nine first bidirectional switches Q1 (in other words, first switch modules QM1a-QM1i), by each of nine first signal wirings W1 (see FIG. 2), and connected to each of the nine second bidirectional switches Q2 (in other words, second switch modules QM2a-QM2i), by each of nine second signal wirings W2 (see FIG. 3). The gate driving circuit 10 performs switching control on the nine first bidirectional switches Q1 and the nine second bidirectional switches Q2 and thereby causes the eighteen bidirectional switches Q to execute switching operations. At this time, the signal wirings W1, W2 for the switch modules QM1, QM2 which are electrically connected in parallel to the same input phase and output phase, respectively, are configured to have the same length.

Specifically, the signal wirings W1, W2 for the switch modules QM1a, QM2a which are electrically connected in parallel to the R-phase and the U-phase, respectively, are configured to have the same length as shown in FIGS. 2 and 3. The signal wirings W1, W2 for the switch modules QM1b, QM2b which are electrically connected in parallel to the S-phase and the U-phase, respectively, are configured to have the same length. The signal wirings W1, W2 for the switch modules QM1c, QM2c which are electrically connected in parallel to the T-phase and the U-phase, respectively, are configured to have the same length. Further, although not specifically shown, the signal wirings W1, W2 for the switch modules QM1d, QM2d which are electrically connected in parallel to the R-phase and the V-phase, respectively, are configured to have the same length. The signal wirings W1, W2 for the switch modules QM1e, QM2e which are electrically connected in parallel to the S-phase and the V-phase, respectively, are configured to have the same length. The signal wirings W1, W2 for the switch modules QM1f, QM2f which are electrically connected in parallel to the T-phase and the V-phase, respectively, are configured to have the same length. Furthermore, although not specifically shown, the signal wirings W1, W2 for the switch modules QM1g, QM2g which are electrically connected in parallel to the R-phase and the W-phase, respectively, are configured to have the same length. The signal wirings W1, W2 for the switch modules QM1h, QM2h which are electrically connected in parallel to the S-phase and the W-phase, respectively, are configured to have the same length. Moreover, the signal wirings W1, W2 for the switch modules QM1i, QM2i which are electrically connected in parallel to the T-phase and the W-phase, respectively, are configured to have the same length.

(Outline of Switch Module Arrangement Structure)

Next, an outline of arrangement structure of the switch modules QM will be described referring to FIG. 4.

As FIG. 4 shows, the first switch modules QM1a-QM1i are arranged in the unified state in the matrix converter 1. Specifically, the first switch modules QM1a-QM1i are arranged so that three first switch modules QM1 respectively connected to the R-phase, S-phase and T-phase are arranged adjacent to one another for each of the U-phase, V-phase, and W-phase. More specifically, the first switch modules QM1a-QM1i are arranged so that three first switch modules QM1 respectively connected to the R-phase, S-phase, T-phase for each of the U-phase, V-phase, W-phase are adjacently arranged in the row along the upper-to-lower direction as the length direction of a housing 110 (see FIG. 5 to be described later) in the matrix converter 1.

The first switch modules QM1a, QM1b, QM1c which are respectively connected to the R-phase, S-phase, T-phase, and further electrically connected in parallel to the U-phase are adjacently arranged in the single row extended along the upper-to-lower direction (see also FIG. 6 and the like to be described later). Further, the first switch modules QM1d, QM1e, QM1f which are respectively connected to the R-phase, S-phase, T-phase, and electrically connected in parallel to the V-phase are adjacently arranged in the single row extended along the upper-to-lower direction (see also FIG. 6 and the like to be described later). Furthermore, the first switch modules QM1g, QM1h, QM1i which are respectively connected to the R-phase, S-phase, T-phase, and electrically connected in parallel to the W-phase are adjacently arranged in the single row extended along the upper-to-lower direction (see also FIG. 6 and the like to be described later). At this time, the row of the first switch modules QM1a, QM1b, QM1c which are connected to the U-phase, the row of the first switch modules QM1d, QM1e, QM1f which are connected to the V-phase, and the row of the first switch modules QM1g, QM1h, QM1i which are connected to the W-phase are arranged along the left-to-right direction (see also FIG. 6 and the like to be described later). Accordingly, the nine first switch modules QM1a-QM1i are arranged in a 3×3 matrix extended along the upper-to-lower and left-to-right directions.

Note that the plurality of first switch modules QM1 may be arbitrarily arranged without being limited to the one as described above.

Further, the second switch modules QM2a-QM2i are arranged collectively for each of the groups. Here, in the present embodiment, the second switch modules QM2a-QM2i are arranged as one group. Therefore, the second switch modules QM2a-QM2i related to the one group are arranged in the unified state. Specifically, the second switch modules QM2a-QM2i are arranged so that three second switch modules QM2 respectively connected to the R-phase, S-phase, T-phase for each of the U-phase, V-phase, W-phase are adjacently arranged. More specifically, the second switch modules QM2a-QM2i are arranged so that the three second switch modules QM2 respectively connected to the R-phase, S-phase, T-phase for each of the U-phase, V-phase, W-phase are adjacently arranged in the single row extended along the upper-to-lower direction.

That is, the second switch modules QM2a, QM2b, QM2c which are respectively connected to the R-phase, S-phase, T-phase, and electrically connected in parallel to the U-phase are adjacently arranged in the single row extended along the upper-to-lower direction (see also FIG. 6 and the like to be described later). Further, the second switch modules QM2d, QM2e, QM2f which are respectively connected to the R-phase, S-phase, T-phase, and electrically connected in parallel to the V-phase are adjacently arranged in the single row extended along the upper-to-lower direction (see also FIG. 6 and the like to be described later). Furthermore, the second switch modules QM2g, QM2h, QM2i which are respectively connected to the R-phase, S-phase, T-phase, and electrically connected in parallel to the W-phase are adjacently arranged in the single row extended along the upper-to-lower direction (see also FIG. 6 and the like to be described later). At this time, the row of the second switch modules QM2a, QM2b, QM2c which are connected to the U-phase, the row of the second switch modules QM2d, QM2e, QM2f which are connected to the V-phase, and the row of the second switch modules QM2g, QM2h, QM2i which are connected to the W-phase are arranged along the left-to-right direction (see also FIG. 6 and the like to be described later). Accordingly, the nine second switch modules QM2a-QM2i are arranged in a 3×3 matrix extended along the upper-to-lower and left-to-right directions.

Note that the plurality of second switch modules QM2 may be arbitrarily arranged without being limited to the one as described above.

The three first switch modules QM1 and the three second switch modules QM2, which are connected to one of output phases are arranged as the single switch row extended along the upper-to-lower direction.

That is, the first switch modules QM1a, QM1b, QM1c, and the second switch modules QM2a, QM2b, QM2c, which are connected to the U-phase are arranged as the single U-phase output switch row extended along the upper-to-lower direction (see also FIG. 6 and the like to be described later). Further, the first switch modules QM1d, QM1e, QM1f, and the second switch modules QM2d, QM2e, QM2f, which are connected to the V-phase are arranged as the single V-phase output switch row extended along the upper-to-lower direction (see also FIG. 6 and the like to be described later). Furthermore, the first switch modules QM1g, QM1h, QM1i, and the second switch modules QM2g, QM2h, QM2i, which are connected to the W-phase are arranged as the single W-phase output switch row extended along the upper-to-lower direction (see also FIG. 6 and the like to be described later).

(Specific Structure of Matrix Converter)

Next, the specific structure of the matrix converter 1 will be described referring to FIGS. 5, 6, 7 and 8. Note that, FIGS. 6 to 8 partially omit the lines for connecting components of the matrix converter 1 to avoid cumbersome illustration.

As FIGS. 5 to 8 show, the matrix converter 1 includes a housing 110, a wind tunnel 120, a main body 130, and a main body case (not shown) for housing the main body 130. The main body 130 includes the AC reactors L1-L3, the first switch modules QM1a-QM1i, the second switch modules QM2a-QM2i, the capacitor modules CM1-CM6, and a substrate (not shown) having the gate driving circuit 10. Note that, FIGS. 5 to 8 illustrate the matrix converter 1 for convenience of description so that the longitudinal direction of the housing 110, the width direction perpendicular to the longitudinal direction, and the depth direction perpendicular both to the longitudinal and width directions correspond to the upper-to-lower direction, the left-to-right direction, and the front-to-rear direction, respectively. In such a case, the upper-to-lower direction corresponds to a first direction.

Three heat sinks 190a, 190b 190c are adjacently attached to a base (not shown) of the housing 110 along the left-to-right direction. Here, the number of the heat sinks attached to the base of the housing 110 is not limited to three, but may be set to an arbitrary value. For example, it is possible to attach one or two heat sinks each with larger width to the base of the housing 110, and to attach four or more heat sinks each with smaller width to the base of the housing 110. Each of the heat sinks 190a-190c is made of the material with higher thermal conductivity such as aluminum and copper. Each of those heat sinks 190a-190c includes a substantially plate base 191, and a plurality of fins 192 erected on the base 191. The fins 192 are attached to the base of the housing 110 so as to be stored in the wind tunnel 120.

The first switch modules QM1a, QM1b, QM1c are adjacently arranged close to each other in a single row extended along the upper-to-lower direction, and the second switch modules QM2a, QM2b, QM2c are adjacently arranged close to each other in a single row extended along the upper-to-lower direction on the front surface of the base 191 of the heat sink 190a at the left side. As a result, the U-phase output switch row is constituted on the front surface of the base 191 of the heat sink 190a at the left side.

The first switch modules QM1d, QM1e, QM1f are adjacently arranged close to each other in a single row extended along the upper-to-lower direction, and the second switch modules QM2d, QM2e, QM2f are adjacently arranged close to each other in a single row extended along the upper-to-lower direction on the front surface of the base 191 of the heat sink 190b at the center. As a result, the V-phase output switch row is constituted on the front surface of the base 191 of the heat sink 190b at the center.

The first switch modules QM1g, QM1h, QM1i are adjacently arranged close to each other in a single row extended along the upper-to-lower direction, and the second switch modules QM2g, QM2h, QM2i are adjacently arranged close to each other in a single row extended along the upper-to-lower direction on the front surface of the base 191 of the heat sink 190c at the right side. As a result, the W-phase output switch row is constituted on the base 191 of the heat sink 190c at the right side.

The wind tunnel 120 formed inside the housing 110 serves as the space which allows refrigerant (air, for example) to flow in the direction parallel to the one along the U-phase output switch row, the V-phase output switch row, and the W-phase output switch row, in other words, in the upperto-lower direction. Specifically, openings 112 (three openings in this example) are formed in the lower wall part of the housing 110, and fans 150 (two fans in this example) are attached to the upper end of the housing 110. The fan 150 draws air from the opening 112 and discharges the air at the upper end of the housing 110 so that the refrigerant flows into the wind tunnel 120 in the upper-to-lower direction (more correctly, from the lower side to the upper side). Here, the fan 150 may be configured to draw air from the upper end of the housing 110, and discharge the air from the opening 112 so that the refrigerant flows into the wind tunnel 120 in the upper-to-lower direction (more correctly, from the upper side to the lower side). Further, the direction in which the refrigerant flows in the wind tunnel 120 is not limited to the upper-to-lower direction, but may be set in any other direction (for example, left-to-right direction).

The AC reactors L1-L3 are installed at the upper side (downstream side of the refrigerant flowing direction) of the heat sinks 190a-190c of the wind tunnel 120 along the left-to-right direction. Those AC reactors L1, L2, L3 are connected to the R-phase, S-phase, T-phase of the AC power supply 2 via a bus bar (not shown), respectively. Specifically, each of the AC reactors L1-L3 includes two terminals LT1, LT2 which protrude from the wind tunnel 120 forward (a part to be stored in the main body case). Each terminal LT1 of the AC reactors L1, L2, L3 is connected to the terminals of the bus bar connected to the R-phase, S-phase, T-phase of the AC power supply 2, respectively through fastening with screws. Here, the respective AC reactors L1-L3 may be connected to the respective output phases of the AC power supply 2 via cables.

The first switch modules QM1a-Qm1i, and the second switch modules QM2a-QM2i include two terminals QT11, QT12 at the left end, and two terminals QT13, QT14 at the right end, respectively.

Each of the capacitor modules CM1-CM6 includes a module cover MC made of resin. Note that the module cover MC is not necessarily made of resin, but may be made of the material other than the resin. Each of the module covers MC for the capacitor modules CM1-CM6 stores three AC capacitors AC and three snubber capacitors SC corresponding to the three relevant switch modules QM. Here, in this example, the three AC capacitors AC, and the three snubber capacitors SC corresponding to the three switch modules QM are stored in the module cover MC, which will be installed as the capacitor module CM in the modularized state. However, the configuration is not limited to the one as described above. For example, the three AC capacitors AC are stored in the module cover so as to be modularized as the capacitor module. Meanwhile, the three snubber capacitors SC may be installed separately from the capacitor module.

Specifically, the module cover MC for the capacitor module CM1 stores the three AC capacitors AC and the three snubber capacitors SC corresponding to the first switch modules QM1a, QM1b, QM1c. The module cover MC for the capacitor module CM2 stores the three AC capacitors AC and the three snubber capacitors SC corresponding to the first switch modules QM1d, QM1e, QM1f. The module cover MC for the capacitor module CM3 stores the three AC capacitors AC and the three snubber capacitors SC corresponding to the first switch modules QM1g, QM1h, QM1i. The module cover MC for the capacitor module CM4 stores the three AC capacitors AC and the three snubber capacitors SC corresponding to the second switch modules QM2a, QM2b, QM2c. The module cover MC for the capacitor module CM5 stores the three AC capacitors AC and the three snubber capacitors SC corresponding to the second switch modules QM2d, QM2e, QM2f. The module cover MC for the capacitor module CM6 stores the three AC capacitors AC and the three snubber capacitors SC corresponding to the second switch modules QM2g, QM2h, QM2i.

Each of the module covers MC for the respective capacitor modules CM1-CM6 has the length (substantially equal to the length of the row of the three switch modules QM) corresponding to the corresponding three switch modules QM. Note that each length of the module covers MC for the respective capacitor modules CM1-CM6 does not have to correspond to the length of the corresponding three switch modules QM. The module cover MC may be longer or shorter than the relevant length.

(Capacitor Module Structure)

Hereinafter, structures of the capacitor modules CM 1-CM6 will be described referring to FIGS. 9A, 9B, 9C, and 10.

As FIGS. 9A, 9B, 9C, and 10 show, each of the module covers MC for the respective capacitor modules CM1-CM6 includes a first storage section MC1 with substantially rectangular parallelepiped shape for storing the three AC capacitors AC, and a second storage section MC2 with substantially rectangular parallelepiped shape for storing the three snubber capacitors SC. Note that the three AC capacitors AC and the three snubber capacitors SC may be stored in the common storage section.

The first storage section MC1 includes input/output terminals T1, T2, T3 for the three AC capacitors AC to be stored, and a neutral point terminal TN connected to a neutral point N (see FIGS. 2 and 3) of the wire connection to the three AC capacitors AC.

Each of the input/output terminals T1, T2, T3 is provided protruding from a bottom surface bs1 of the first storage section MC1 at one side (right side in this example) of the module cover MC in the width direction. Each of the input/output terminals T1, T2, T3 has its tip end bent to be in parallel with the bottom surface bs1 in the plane direction. The neutral point terminal TN is disposed on the side surface (left side surface 1s in this example) of the first storage section MC1, and is formed so that the plane direction of its tip end is parallel to the bottom surface bs1.

The second storage section MC2 is disposed on the other side (left side in this example) of the module cover MC in the width direction to the rear of the first storage section MC1. As a result, the module cover MC stores the three snubber capacitors SC closer to the bottom surface bs2 side of the second storage section MC2 (rear side in this example) than the three AC capacitors AC. The second storage section MC2 includes the input/output terminals for the three snubber capacitors SC to be stored.

That is, the second storage section MC2 includes input/output terminals T4a, T4b, T4c, T4d of the snubber capacitors SC at one side (upper side in this example) in a depth direction perpendicular to the width direction of the module cover MC, input/output terminals T5a, T5b, T5c, T5d of the snubber capacitors SC at the other side (lower side in this example) of the module cover MC in the depth direction, and input/output terminals T6a, T6b of the snubber capacitor SC at the center.

Each of the input/output terminals T4a, T4b, T5a, T5b, T6a, T6b is provided protruding from the bottom surface bs2 at the left side of the module cover MC. Each of the input/output terminals T4c, T4d is provided protruding from the bottom surface bs2 at the upper side of the module cover MC. Each of the input/output terminals T5c, T5d is provided protruding from the bottom surface bs2 at the lower side of the module cover MC. Each of the input/output terminals T4a, T4b, T4c, T4d, T5a, T5b, T5c, T5d, T6a, T6b is formed to be bent so that the plane direction of its tip end is parallel to the bottom surface bs2.

The position of each tip end of the respective input/output terminals T1, T2, T3, T4a, T4b, T5a, T5b, T6a, T6b in the depth direction (front-to-rear direction in this example) perpendicular both to the width and depth directions of the module cover MC is located on the rear side of the position of each tip end of the other input/output terminals T4c, T4d, T5c, T5d in the front-to-rear direction. The respective positions of the tip ends of the input/output terminals T1, T2, T3, T4a, T4b, T5a, T5b, T6a, T6b in the front-to-rear direction coincide with one another. Here, the respective positions of the tip ends of the input/output terminals T1, T2, T3, T4a, T4b, T5a, T5b, T6a, T6b in the front-to-rear direction do not have to coincide with one another.

The above structured respective capacitor modules CM1-CM6 are allowed to self-stand on the corresponding three switch capacitors QM by the input/output terminals T1, T2, T3, T4a, T4b, T5a, T5b, T6a, T6b arranged at both left and right sides (allowed to stand so that the bottom surfaces bs1, bs2 are not grounded)(see FIG. 10). In other words, the input/output terminals T1, T2, T3, T4a, T4b, T5a, T5b, T6a, T6b which are arranged at both left and right sides of the module cover MC may constitute a plurality of terminals.

Note that the position of each tip end of the input/output terminals T4c, T4d, T5c, T5d in the front-to-rear direction may mutually coincide with the position of each tip end of the respective input/output terminals T1, T2, T3, T4a, T4b, T5a, T5b, T6a, T6b in the front-to-rear direction. In such a case, those input/output terminals T1, T2, T3, T4a, T4b, T5a, T5b, T6a, T6b, and T4c, T4d, T5c, T5d allow the respective capacitor modules CM1-CM6 to self-stand on the corresponding three switch capacitors QM. In the aforementioned case, the input/output terminals T1, T2, T3, T4a, T4b, T5a, T5b, T6a, T6b arranged at the both left and right sides of the module cover MC, and the input/output terminals T4c, T4d, T5c, T5d arranged at the both upper and lower sides may constitute a plurality of terminals. Further, the respective capacitor modules CM1-CM6 do not have to self-stand on the corresponding three switch capacitors QM by the plurality of terminals protruding from the bottom surface of the module cover MC. They may be installed while being supported by the fastening member (sheet metal and the like).

(Structure of Each Bus Bar)

As FIGS. 5 to 8 show, the AC reactors L1, L2, L3 are connected to the corresponding switch modules QM via a laminate bus bar 11, and three laminate bus bars 12. Note that the laminate bus bar 11 and the laminate bus bars 12 correspond to the second bus bar. Further, the AC reactors L1, L2, L3 may be connected to the corresponding switch modules QM via bus bars with the other configuration or the cable.

The laminate bus bar 11 is formed by laminating a flat plate first bus bar 11A, a first insulating sheet (not shown), a flat plate second bus bar 11B, a second insulating sheet (not shown), and a flat plate third bus bar 11C in this order from one side (rear side in this example) to the other side (front side in this example) in the thickness direction. Note that the first bus bar 11A, the second bus bar 11B, and the third bus bar 11C correspond to the conductor. The first insulating sheet allows suppression of short circuit between the first bus bar 11A and the second bus bar 11B. The second insulating sheet allows suppression of short circuit between the second bus bar 11B and the third bus bar 11C.

The first bus bar 11A includes a terminal 11A1 at the left end of the first flat plate extending in the left-to-right direction, and three terminals (not shown, which will be referred to as "first terminal" below) at each tip end of three second flat plates extending downward from the left end, the intermediate part, and the right end of the first flat plate, respectively. The second bus bar 11B includes a terminal 11B1 at the left end of the first flat plate extending in the left-to-right direction, and three terminals (not shown, which will be referred to as "second terminal" below) at each tip end of three second flat plates extending downward from the left end, the intermediate part, and the right end of the first flat plate, respectively. The third bus bar 11C includes a terminal 11C1 at the left end of the first flat plate extending in the left-to-right direction, and three terminals (not shown, which will be referred to as "third terminal" below) at each tip end of the three second flat plates extending downward from the left end, the intermediate part, and the right end of the first flat plate, respectively.

The terminals 11A1, 11B1, 11C1 are arranged in this order from the left to the right at substantially the same positions in the upper-to-lower direction of the laminate bus bar 11. The first terminal, the second terminal, and the third terminal at the left ends of the bus bars 11A, 11B, 11C are arranged in this order from the upper to the lower side at substantially the same positions in the left-to-right direction of the laminate bus bar 11. This applies also to the first terminals, the second terminals, and the third terminals at the corresponding intermediate parts and the right ends of the bus bars 11A, 11B, 11C, respectively.

Each of the laminate bus bars 12 is formed by laminating a flat plate first bus bar 12A, a first insulating sheet 12D, a flat plate second bus bar 12B, a second insulating sheet 12E, and a flat plate third bus bar 12C in this order from one side (left side in this example) to the other side (right side in this example) in the thickness direction. Note that the first bus bar 12A, the second bus bar 12B, and the third bus bar 12C correspond to the conductor. The insulating sheet 12D allows suppression of short circuit between the first bus bar 12A and the second bus bar 12B. The second insulating sheet 12E allows suppression of short circuit between the second bus bar 12B and the third bus bar 12C.

The first bus bar 12A includes a terminal 12A1 protruding forward and a terminal 12A2 protruding rearward at the upper end side, and a terminal 12A3 protruding rearward at the lower end side. Each of the terminals 12A1, 12A2, 12A3 is formed to be bent so that the plane direction of its tip end is parallel to the thickness direction of a laminate bus bar 12. The second bus bar 12B includes a terminal 12B1 protruding forward and a terminal 12B2 protruding rearward at the upper end side, and a terminal 12B3 protruding rearward at the lower end side. Each of the terminals 12B1, 12B2, 12B3 is formed to be bent so that the plane direction of its tip end is parallel to the thickness direction of the laminate bus bar 12. The third bus bar 12C includes a terminal 12C1 protruding forward and a terminal 12C2 protruding rearward at the upper end side, and a terminal 12C3 protruding rearward at the lower end side. Each of the terminals 12C1, 12C2, 12C3 is formed to be bent so that the plane direction of its tip end is parallel to the thickness direction of the laminate bus bar 12.

The terminals 12A1, 12B1, 12C1 are arranged in this order from the upper to the lower side at substantially the same positions of the laminate bus bar 12 in the left-to-right direction. The terminals 12A2, 12B2, 12C2, 12A3, 12B3, 12C3 are arranged in this order from the upper to the lower side at substantially the same positions of the laminate bus bar 12 in the left-to-right direction.

Further, the U-phase, V-phase, W-phase of the load 4 are connected to the corresponding switch modules QM via three bus bars 13, and a bus bar 14. Note that the U-phase, V-phase, W-phase of the load 4 may be connected to the corresponding switch modules QM via bus bars with the other configuration or the cable.

Each of the bus bars 13 includes terminals 131, 132, 133, 134, 135, 136 which protrude rearward at six positions from one end (upper end in this example) to the other end (lower end in this example) in the length direction, and a terminal 137 protruding forward at the lower end side. Each of the terminals 131-137 is formed to be bent so that the plane direction of its tip end is parallel to the thickness direction (left-to-right direction in this example) of the bus bar 13.

(Connection Relation of Respective Components for Matrix Converter)

Terminals QT13 for the respective switch modules QM1a, QM1b, QM1c, QM2a, QM2b, QM2c are connected to terminals 12A2, 12B2, 12C2, 12A3, 12B3, 12D3 of the laminate bus bar 12, respectively. The terminals QT13 for the respective first switch modules QM1a, QM1b, QM1c are also connected to the input/output terminals T1, T2, T3 (see FIG. 9B and the like) of the capacitor module CM1, respectively, and fixed together with the terminals 12A2, 12B2, 12C2 of the laminate bus bar 12 through fastening with screws. Further, the terminals QT13 for the respective second switch modules QM2a, QM2b, QM2c are also connected to the input/output terminals T1, T2, T3 (see FIG. 9B and the like) of the capacitor module CM4, and fixed together with the terminals 12A3, 12B3, 12D3 of the laminate bus bar 12 through fastening with screws. Moreover, the terminals QT13 for the respective switch modules QM1d, QM1e, QM1f, QM2d, QM2e, QM2f are also connected to the laminate bus bar 12 and the capacitor modules CM2, CM5 as well. Furthermore, the terminals QT13 for the respective switch modules QM1g, QM1h, QM1i, QM2g, QM2h, QM2i are also connected to the laminate bus bar 12 and the capacitor modules CM3, CM6.

The terminals 12A1, 12B1, 12C1 of the laminate bus bar 12, connected to the switch modules QM1a, QM1b, QM1c, QM2a, QM2b, QM2c are connected to the first terminal, the second terminal, and the third terminal at the left end of the laminate bus bar 11 through fastening with screws. The terminals 12A1, 12B1, 12C1 of the laminate bus bar 12, connected to the switch modules QM1d, QM1e, QM1f, QM2d, QM2e, QM2f are connected respectively to the first terminal, the second terminal, the third terminal at the center of the laminate bus bar 11 through fastening with the screw. The terminals 12A1, 12B1, 12C1 of the laminate bus bar 12, connected to the switch modules QM1g, QM1h, QM1i, QM2g, QM2h, QM2i are connected to the first terminal, the second terminal, the third terminal at the right end of the laminate bus bar 11 through fastening with screws.

The terminals 11A1, 11B1, 11C1 of the laminate bus bar 11 are connected respectively to the terminals LT2 for the respective AC reactors L1, L2, L3 via a bus bar 17.

Further, the terminals QT11, QT12 of the respective first switch modules QM1a, QM1b, QM1c are connected to the input/output terminals 4a, 4b, 6a, 6b, 5a, 5b of the capacitor module CM1, respectively through fastening with screws. Likewise, the terminals QT11, QT12 of the respective first switch modules QM1d, QM1e, QM1f are connected to the capacitor module CM2. Likewise, the terminals QT11, QT12 of the respective first switch modules QM1g, QM1h, QM1i are connected to the capacitor module CM3. The terminals QT11, QT12 of the respective second switch modules QM2a, QM2b, QM2c are connected to the input/output terminals 4a, 4b, 6a, 6b, 5a, 5b of the capacitor module CM4 respectively through fastening with screws. Likewise, the terminals QT11, QT12 of the respective second switch modules QM2d, QM2e, QM2f are connected to the capacitor module CM5. Likewise, the terminals QT11, QT12 of the respective second switch modules QM2g, QM2h, QM2i are connected to the capacitor module CM6.

The input/output terminals T1-T3 are connected to the terminals QT13 of the three switch modules QM, and the input/output terminals 4a, 4b, 6a, 6b, 5a, 5b are connected to the terminals QT11, QT12 of the three switch modules QM so that the respective capacitor modules CM1-CM6 are installed on the corresponding three switch modules QM in a self-standing state.

That is, the respective terminals T5c, T5d of the capacitor modules CM1-CM3 and the respective terminals T4c, T4d (see FIG. 9B and the like) of the capacitor modules CM4-CM6 are connected through fastening with screws. At this timing, the neutral point terminals TN among the capacitor modules CM1-CM6 are connected via a bus bar 15 (corresponding to the first bus bar).

The bus bar 15 includes a linear unit 15A which extends in the left-to-right direction, a linear unit 15B which is connected to the left end of the linear unit 15A, and extends in the upper-to-lower direction, a linear unit 15C which is connected to substantially the center of the linear unit 15A, and extends in the upper-to-lower direction, and a linear unit 15D which is connected to the right end of the linear unit 15A, and extends in the upper-to-lower direction. Terminals 15B1, 15B2 are disposed on both ends of the linear unit 15B, respectively. Terminals 15C1, 15C2 are disposed on both ends of the linear unit 15C, respectively. Terminals 15D1, 15D2 are disposed on both ends of the linear unit 15D, respectively.

The respective neutral point terminals TN of the capacitor modules CM1, CM2, CM3, CM4, CM5, CM6 are connected to the terminals 15B1, 15C1, 15D1, 15B2, 15C2, 15D2 of the bus bar 15 through fastening with screws, respectively.

Further, respective terminals 161, 162 disposed on appropriate positions of a bus bar 16 to be connected to the discharge circuit (not shown) are connected to the respective terminals T4c, T4d (see FIG. 9B and the like) of the capacitor modules CM1-CM3 through fastening with screws. As a result, the snubber capacitors SC of the respective capacitor modules CM1-CM6 are connected to the discharge circuit.

Moreover, the respective terminals QT14 of the switch modules QM1a, QM1b, QM1c, QM2a, QM2b, QM2c are connected to the terminals 131, 132, 133, 134, 135, 136 of the bus bar 13 respectively through fastening with screws. Furthermore, the respective terminals QT14 of the switch modules QM1d, QM1e, QM1f, QM2d, QM2e, QM2f are connected to the bus bar 13 as well. Likewise, the respective terminals QT13 of the switch modules QM1g, QM1h, QM1i, QM2g, QM2h, QM2i are connected to the bus bar 13 as well.

The terminal 137 of the bus bar 13, which is connected to the switch modules QM1a, QM1b, QM1c, QM2a, QM2b, QM2c, is connected to a terminal 141 of the bus bar 14 through fastening with screws. The terminal 137 of the bus bar 13, which is connected to the switch modules QM1d, QM1e, QM1f, QM2d, QM2e, QM2f, is connected to a terminal 142 of the bus bar 14 through fastening with screws. A terminal 143 of the bus bar 13, which is connected to the switch modules QM1g, QM1h, QM1i, QM2g, QM2h, QM2*i*, is connected to the terminal 142 of the bus bar 14 through fastening with screws.

Terminals 144, 145, 146 of the bus bar 14 are connected to the U-phase, V-phase, W-phase of the load 4 via the appropriate connection member (bus bar, cable, or the like), respectively.

(Effect of the Present Embodiment)

As described above, the matrix converter 1 according to the present embodiment includes the plurality of first bidirectional switches Q1 which is connected to the respective input phases of the AC power supply 2 and the respective output phases of the load 4, respectively, and the plurality of second bidirectional switches Q2 electrically connected to the same input and output phases as those to which the first bidirectional switches Q1 are connected, in parallel to the first bidirectional switches Q1. The matrix converter 1 performs switching between the first bidirectional switch Q1 and the second bidirectional switch Q2 so that the AC power of the AC power supply 2 is converted into AC power at the arbitrary voltage and frequency, and outputs the resultant power to the load 4.

Here, the applicable rated current is determined for each of the bidirectional switches Q. The rated current of the matrix converter 1 cannot be increased beyond the rated current of the bidirectional switch Q, which may restrict increase in the capacity of the matrix converter 1.

In the present embodiment, the plurality of bidirectional switches Q is connected to the respective input phases of the AC power supply 2 and the respective output phases of the load 4 in parallel. As a result, since it is possible to reduce the current flowing through the respective bidirectional switches Q (in the case of two switches connected in parallel, for example, the current flowing through one of the bidirectional switches Q may be reduced by half), it is possible to significantly increase the rated current of the matrix converter 1 while suppressing the current in the bidirectional switch Q within the rated current. Therefore, it is possible to realize the matrix converter 1 with large capacity.

Especially in the present embodiment, further, the second bidirectional switches Q2 have one or more groups (one group in the present embodiment) each having the same number of the second bidirectional switches Q2 as that of the first bidirectional switches Q1. As a result, since it is possible to increase the capacity of the matrix converter 1 by increasing the number of groups of the second bidirectional switches Q2, it is easy to enlarge the capacity.

Especially in the present embodiment, further, the plurality of first bidirectional switches Q1 is arranged in the unified manner, and the plurality of second bidirectional switches Q2 is arranged collectively for each of the groups. As a result, the capacity of the matrix converter 1 may be increased only by increasing the number of groups of the second bidirectional switches Q2 without requiring change in the arrangement structure of the existing switches. Therefore, it is easy to enlarge the capacity.

Further, the present embodiment especially provides the following effect. That is, in the matrix converter 1, the current flows between the bidirectional switches Q connected to the respective input phases via the AC capacitor. In other words, as described in the present embodiment, in the case of three input phases (R-phase, S-phase, T-phase) of the AC power supply 2, the current flows across the bidirectional switches Q between the R-phase and the S-phase, the S-phase and the T-phase, and the R-phase and the T-phase, respectively. At this time, the large inductance of wiring between the respective bidirectional switches Q may also increase the surge voltage, which makes it difficult to enlarge the capacity. In the present embodiment, the bidirectional switches Q which are connected to the respective input phases are arranged adjacently, resulting in reduced inductance of the wiring between the respective bidirectional switches Q. As a result, since it is possible to increase the current while suppressing increase in the surge voltage, it is easy to enlarge the capacity of the matrix converter 1.

Especially in the present embodiment, further, the plurality of first bidirectional switches Q1 and the plurality of second bidirectional switches Q2 which are connected to one of the output phases are arranged in a single switch row extended along the upper-to-lower direction. As a result, it is possible to reduce the dimension of the matrix converter 1 in the width direction.

Especially in the present embodiment, further, the wind tunnel 120 is configured to allow the refrigerant to flow in the upper-to-lower direction. As a result, the wind tunnel 120 allows the refrigerant to flow in the direction perpendicular to the left-to-right direction in which the plurality of first bidirectional switches Q1 and the plurality of second bidirectional switches Q2 which are connected to one of the input phases (R-phase, S-phase, or T-phase) are arranged. As a result, the heat of the respective bidirectional switches Q may be uniformly transferred with respect to the refrigerant flow direction by the heat sinks 190*a*-190*c*, thus improving the cooling efficiency.

Further, the present embodiment especially provides the following effect. That is, as described above, in the matrix converter 1, the current flows between the bidirectional switches Q connected to the respective input phases via the AC capacitor. In the case of the large wiring inductance between the respective AC capacitors, the surge voltage is increased, which makes it difficult to enlarge the capacity. In the present embodiment, since the plurality of AC capacitors corresponding to the bidirectional switches Q connected to the respective input phases is stored in the single module cover MC, it is possible to arrange the AC capacitors adjacently. As a result, since it is possible to reduce the wiring inductance between the respective AC capacitors and thereby to increase the current while suppressing increase in the surge voltage, it is easy to enlarge the capacity of the matrix converter 1. Moreover, the AC capacitors may be modularized in units of single set of input phases (R-phase, S-phase, T-phase), and thereby the capacity of the matrix converter 1 may be increased by adding the capacitor module CM for each output phase (U-phase, V-phase, W-phase) to the group of the increased second bidirectional switches Q2. Therefore, it is more easier to enlarge the capacity.

Further, especially in the present embodiment, the capacitor module CM is installed in a self-standing manner on the plurality of adjacently arranged bidirectional switches Q by means of the terminals T1, T2, T3, T4*a*, T4*b*, T5*a*, T5*b*, T6*a*, T6*b* which protrude from the bottom surfaces bs1, bs2 of the module cover MC. As a result, the bidirectional switches Q and the AC capacitors may be adjacently arranged so as to reduce the wiring inductance therebetween. As a result, since it is possible to increase the current while suppressing increase in the surge voltage, it is easy to enlarge the capacity of the matrix converter 1. Moreover, since a fixing member for fixing the capacitor module CM is no longer necessary, it is possible to reduce the number of components and the cost. As it is not necessary to set the insulating distance between the fixing member and the respective components, the structure may be made compact.

Further, especially in the present embodiment, the module cover MC stores the plurality of snubber capacitors SC corresponding to the plurality of adjacently arranged bidirectional switches Q on the rear side of the plurality of AC capacitors. As a result, when the capacity of the matrix converter 1 is increased, the AC capacitors and the snubber capacitors SC may be easily added by adding the capacitor module CM for each of the output phases (U-phase, V-phase, W-phase) to the increased group of second bidirectional switches Q2. Therefore, it is more easier to enlarge the capacity. Moreover, since the snubber capacitor SC may be disposed closer to the bidirectional switch Q than the AC capacitor, it is possible to enhance the effect for suppressing the surge voltage.

Further, the present embodiment especially provides the following effect. That is, there may be a case where difference in the wiring structure of the bus bar or the like generates potential difference between the respective capacitor modules CM at the same output phase. In the present embodiment, since current flows through the bus bar 15 connected to the neutral point terminal TN among the capacitor modules CM1-CM6 so that the potential difference is reduced, it is possible to improve stability and reliability of the operation of the matrix converter 1.

Further, especially in the present embodiment, as the module cover MC is made of resin, the insulating distance between the capacitor module CM and the other component may be reduced. As a result, the bus bar may be arranged near the capacitor module CM, thus improving degree of freedom in the component arrangement.

Further, the present embodiment especially provides the following effect. As described above, in the matrix converter 1, current flows across the bidirectional switches Q between the R-phase and the S-phase, the S-phase and the T-phase, the R-phase and the T-phase, respectively. In the present embodiment, it is assumed that the laminate bus bars 11, 12 contained in the current path are formed by laminating the plate bus bars 12A, 12B, 12C each connected to the input phase. As a result, since the magnetic fields generated in the two laminated bus bars when the current flows are applied in mutually reversed directions and thus cancelled, it is possible to improve the effect for reducing the wiring inductance. Therefore, it is more easier to enlarge the capacity of the matrix converter 1.

Further, especially in the present embodiment, each of the first signal wiring W1 of the first bidirectional switch Q1 and the second signal wiring W2 of the second bidirectional switch Q2 has the same length, both switches of which are electrically connected to the same input and output phases in parallel. As a result, since it is possible to perform switching operations between the first bidirectional switch Q1 and the second bidirectional switch Q2 which are electrically connected in parallel to the same input and output phases synchronously with high accuracy, it is possible to improve the operation stability and reliability of the matrix converter 1.

Furthermore, especially in the present embodiment, since the plurality of terminals T1, T2, T3, T4a, T4b, T5a, T5b, T6a, T6b supports the module cover MC at both left and right sides, it is possible to allow the capacitor module CM to stably self-stand and to enhance the installation strength.

Moreover, especially in the present embodiment, the capacitor module CM includes the input/output terminals T1, T2, T3 of the AC capacitor section AC arranged on the right side of the module cover MC, and the input/output terminals T4a, T4b, T5a, T5b, T6a, T6b of the snubber capacitor SC arranged on the left side of the module cover MC. As a result, it is possible to install the capacitor module CM in a self-standing manner on the bidirectional switch Q including the terminals QT13, QT14 as the input/output terminals of the AC capacitor arranged on the right side, and the terminals QT11, QT12 as the input/output terminals of the snubber capacitor SC arranged on the left side while using the plurality of terminals T1, T2, T3, T4a, T4b, T5a, T5b, T6a, T6b as the support member.

In addition, especially in the present embodiment, the capacitor module CM includes the input/output terminals T4c, T4d, T5c, T5d of the snubber capacitor SC, arranged on both upper and lower sides of the module cover CM. As a result, it is possible to use those input/output terminals T4c, T4d, T5c, T5d as the terminals for connecting the snubber capacitors SC between the respective capacitor modules CM, and as the terminals for connecting the snubber capacitor SC and the discharge circuit. Further, since the terminals are arranged on four sides of the module cover MC, in the present embodiment, in the case where the input/output terminals T4c, T4d, T5c, T5d are made available for self-standing of the capacitor module CM, it is possible to further improve the self-standing stability and the installation strength of the capacitor module CM.

Further, especially in the present embodiment, the module cover MC has the length corresponding to the plurality of bidirectional switches Q arranged in the single row. As a result, since the AC capacitor and the snubber capacitor SC may be arranged on the corresponding bidirectional switch Q, it is possible to further reduce the wiring inductance between the bidirectional switch Q and the AC capacitor, or the bidirectional switch Q and the snubber capacitor SC. Moreover, the correspondence relationship between the capacitor module CM and the bidirectional switch Q may be visually recognized with ease.

<Modified Example>

Note that the first embodiment is not limited to the one as described above, but may be modified in various forms so long as it does not deviate from the scope and technical idea thereof. In the embodiment, one group of the second switch modules QM2 (second bidirectional switch Q2) is provided, with nine second switch modules QM2, the number of which is the same as the number of the first switch modules QM1 (first bidirectional switch Q1), as one group. However, the number of the groups of the second switch modules Q2 is not limited to one but may be two or more.

In an example as shown in FIG. 11, for example, three groups of the second switch modules QM2 are provided with nine modules as one group. In other words, the modified example corresponds to the structure formed by adding two groups of the second switch modules QM2 to the one according to the embodiment. That is, in the modified example, the groups of the second switch modules QM2a-QM2i, QM2a'-QM2i', and QM2a"-QM2i" are provided.

In the above-described structure, the second switch modules QM2a-QM2i, QM2a'-QM2i', and QM2a"-QM2i" are arranged collectively for each of the groups. Specifically, the second switch modules QM2a-QM2i, QM2a'-QM2i', QM2a"-QM2i" are arranged in the respective groups so that the three second switch modules QM2 to be connected to the corresponding R-phase, S-phase, T-phase are adjacently arranged for each of the U-phase, V-phase, and W-phase. More specifically, in the respective groups of the second switch modules QM2a-QM2i, QM2a'-QM2i', QM2a"-QM2i", the three second switch modules QM2 to be connected to the corresponding R-phase, S-phase, T-phase are adjacently arranged for each of the U-phase, V-phase, W-phase in the single row extended along the upper-to-lower direction.

The three first switch modules QM1 connected to one of the output phases, and the three second switch modules QM2 of the respective groups are arranged as the single switch row extended along the upper-to-lower direction. In other words, the first switch modules QM1a, QM1b, QM1c, the second switch modules QM2a, QM2b, QM2c of one group, the second switch modules QM2a', QM2b'. QM2c' of another group, and the second switch modules Qm2a", QM2b", QM2c" of still another group, all of which are connected to the U-phase, are arranged as the single U-phase output switch row extended along the upper-to-lower direction. Further, the first switch modules QM1d, QM1e, QM1f, the second switch modules QM2d, QM2e, QM2f of one group, the second switch modules QM2d', QM2e', QM2f' of another group, and the second switch modules Qm2d", QM2e", QM2f" of still another group, all of which are connected to the V-phase, are arranged as the V-phase output switch row extended along the upper-to-lower direction. Furthermore, the first switch modules QM1g, QM1h, QM1i, the second switch modules QM2g, QM2h, QM2i of one group, the second switch modules QM2g', QM2h', QM2i' of another group, and the second switch modules QM2g", QM2h", QM2i" of still another group, all of which are connected to the W-phase, are arranged in the W-phase output switch row extended along the upper-to-lower direction.

The modified example also provides the similar effects as those derived from the embodiment.

<Second Embodiment>

Next, a second embodiment will be described. Note that, in the description of the second embodiment below, the same components as those of the first embodiment will be designated with the same codes, and explanations thereof, thus will be omitted or simplified.

(Circuit Configuration of Matrix Converter)

Firstly, the circuit configuration of the matrix converter according to the present embodiment will be described referring to FIG. 12.

As FIG. 12 shows, a matrix converter 1' includes a filter circuit F, nine first bidirectional switches q1, and nine second bidirectional switches q2. In the following, appropriately, the first bidirectional switches q1 and the second bidirectional switches q2 will be simply referred to as "bidirectional switch q" in the case of requiring no distinguishment.

The filter circuit F is provided between the AC power supply 2 and the bidirectional switches q. The filter circuit F is mounted as a so called LC filter (referred to also as "LC circuit") constituted by the three AC reactors L1, L2, L3, and three capacitor sections 20a, 20b, 20c. In the following, appropriately, the capacitor sections 20a, 20b, 20c will be simply referred to as "capacitor section 20" in the case of requiring no distinguishment.

Each of the capacitor sections 20a, 20b, 20c includes five capacitors 21 (see FIG. 14 to be described later) which are electrically connected in parallel. Note that the number of the capacitors 21 of the capacitor section 20 is not limited to five, but may be another number. Those capacitor sections 20a, 20b, 20c are connected to the R-phase, S-phase, T-phase (star connection, for example) at the output sides of the AC reactors L1, L2, L3, respectively.

Note that the configuration of the filter circuit F is not limited to the one as described above, but may be another configuration.

Each of the nine first bidirectional switches q1 has the configuration similar to that of the first bidirectional switch Q1 according to the first embodiment. Those nine first bidirectional switches q1 are connected to any of the R-phase, S-phase, T-phase at the output side of the filter circuit F, and to any of the U-phase, V-phase, W-phase of the load 4 as described above.

That is, the first bidirectional switches q1 modularized as a first switch module qm1a are connected to the R-phase and the U-phase. Further, the first bidirectional switches q1 modularized as a first switch module qm1b are connected to the S-phase and the U-phase. Furthermore, the first bidirectional switches q1 modularized as a first switch module qm1c are connected to the T-phase and the U-phase. The first bidirectional switches q1 modularized as a first switch module qm1d are connected to the R-phase and the V-phase. Further, the first bidirectional switches q1 modularized as a first switch module qm1e are connected to the S-phase and the V-phase. Furthermore, the first bidirectional switches q1 modularized as a first switch module qm1f are connected to the T-phase and the V-phase. The first bidirectional switches q1 modularized as a first switch module qm1g are connected to the R-phase and the W-phase. Further, the first bidirectional switches q1 modularized as a first switch module qm1h are connected to the S-phase and the W-phase. Furthermore, the first bidirectional switches q1 modularized as a first switch module qm1i are connected to the T-phase and the W-phase. In the following, appropriately, the first switch modules qm1a-qm1i will be simply referred to as "first switch module qm1" in the case of requiring no distinguishment.

Each of the nine second bidirectional switches q2 has the configuration similar to that of the first bidirectional switch Q1 according to the first embodiment. Those nine second bidirectional switches q2 are connected to any of the R-phase, S-phase, T-phase at the output side of the filter circuit F, and to any of the U-phase, V-phase, W-phase of the load 4, respectively. At this time, the nine second bidirectional switches q2 are electrically connected to the same input phase as the one to which the first bidirectional switches q1 are connected in parallel thereto, and are electrically connected to the same output phase as the one to which the first bidirectional switches q1 are connected in parallel thereto, respectively.

That is, the second bidirectional switches q2 modularized as a second switch module qm2a are electrically connected to the R-phase and the U-phase in parallel to the first bidirectional switches q1 related to the first switch module qm1a. Further, the second bidirectional switches q2 modularized as a second switch module qm2b are electrically connected to the S-phase and the U-phase in parallel to the first bidirectional switches q1 related to the first switch module qm1b. Furthermore, the second bidirectional switches q2 modularized as a second switch module qm2c are electrically connected to the T-phase and the U-phase in parallel to the first bidirectional switches q1 related to the first switch module qm1c. The second bidirectional switches q2 modularized as a second switch module qm2d are electrically connected to the R-phase and the V-phase in parallel to the first bidirectional switches q1 related to the first switch module qm1d. Further, the second bidirectional switches q2 modularized as a second switch module qm2e are electrically connected to the S-phase and the V-phase in parallel to the first bidirectional switches q1 related to the first switch module qm1e. Furthermore, the second bidirectional switches q2 modularized as a second switch module qm2f are electrically connected to the T-phase and the V-phase in parallel to the first bidirectional switches q1 related to the first switch module qm1f. The second bidirectional switches q2 modularized as a second switch module qm2g are electrically connected to the R-phase and the W-phase in parallel to the first bidirectional switches q1 related to the first switch module qm1g. Further, the second bidirectional switches q2 modularized as a second switch module qm2h are electrically connected to the S-phase and the W-phase in parallel to the first bidirectional switches q1 related to the first switch module qm1h. Furthermore, the second bidirectional switches q2 modularized as a second switch module qm2i are electrically connected to the T-phase and the W-phase in parallel to the first bidirectional switches q1 related to the first switch module qm1i. In the following, appropriately, the second switch modules qm2a-qm2i will be simply referred to as "second switch module qm2" in the case of requiring no distinguishment. In the following, appropriately, the first switch module qm1 and the second switch module qm2 will be simply referred to as the "switch module qm" in the case of requiring no distinguishment.

In the matrix converter 1' as described above, the gate driving circuit (not shown) performs switching control on the nine first bidirectional switches q1 and the nine second bidirectional switches q2, thereby causing those eighteen bidirectional switches q to execute switching operations.
(Outline of Arrangement Structure of Switch Module)

Next, the outline of arrangement structure of the switch modules qm will be described referring to FIG. 13.

As FIG. 13 shows, in the matrix converter 1', the first switch modules qm1 and the second switch modules qm2 which are connected to the same input and output phases are arranged adjacently. In this example, the first switch modules qm1 and the second switch modules qm2 which are connected to the same input and output phases are arranged adjacently in the upper-to-lower direction as the length direction of the housing 110 (see FIG. 14 to be described later) of the matrix converter 1'.

In other words, the first switch module qm1a and the second switch module qm2a which are connected to the R-phase and the U-phase are arranged adjacently in the upper-to-lower direction. Further, the first switch module qm1b and the second switch module qm2b which are connected to the S-phase and the U-phase are arranged adjacently in the upper-to-lower direction. Furthermore, the first switch module qm1c and the second switch module qm2c which are connected to the T-phase and the U-phase are arranged adjacently in the upper-to-lower direction. The first switch module qm1d and the second switch module qm2d which are connected to the R-phase and the V-phase are arranged adjacently in the upper-to-lower direction. Further, the first switch module qm1e and the second switch module qm2e which are connected to the S-phase and the V-phase are arranged adjacently in the upper-to-lower direction. Furthermore, the first switch module qm1f and the second switch module qm2f which are connected to the T-phase and the V-phase are arranged adjacently in the upper-to-lower direction. The first switch module qm1g and the second switch module qm2g which are connected to the R-phase and the W-phase are arranged adjacently in the upper-to-lower direction. Further, the first switch module qm1h and the second switch module qm2h which are connected to the S-phase and the W-phase are arranged adjacently in the upper-to-lower direction. Furthermore, the first switch module qm1i and the second switch module qm2i which are connected to the T-phase and the W-phase are arranged adjacently in the upper-to-lower direction.

The three first switch modules qm1 and the three second switch modules qm2 which are connected to one of the output phases are arranged as the single switch row extended along the upper-to-lower direction. In this example, three pairs of the first switch modules qm1 and the second switch modules qm2 which are connected to the same input and output phases are arranged along the upper-to-lower direction. As a result, the three first switch modules qm1 and the three second switch modules qm2 which are related to those three pairs and connected to one of the output phases may be arranged as the single switch row extended along the upper-to-lower direction.

That is, a pair of the first switch module qm1a and the second switch module qm2a which are connected to the R-phase and the U-phase, a pair of the first switch module qm1b and the second switch module qm2b which are connected to the S-phase and the U-phase, and a pair of the first switch module qm1c and the second switch module qm2c which are connected to the T-phase and the U-phase are arranged along the upper-to-lower direction. As a result, the first switch module qm1a, the second switch module qm2a, the first switch module qm1b, the second switch module qm2b, the first switch module qm1c, and the second switch module qm2c, which are connected to the U-phase are arranged as the single U-phase output switch row extended along the upper-to-lower direction (see also FIG. 15 and the like to be described later). Further, the pair of the first switch module qm1d and the second switch module qm2d which are connected to the R-phase and the V-phase, the pair of the first switch module qm1e and the second switch module qm2e which are connected to the S-phase and the V-phase, and the pair of the first switch module via and the second switch module qm2f which are connected to the T-phase and the V-phase are arranged along the upper-to-lower direction. As a result, the first switch module qm1d, the second switch module qm2d, the first switch module qm1e, the second switch module qm2e, the first switch module qm1f, and the second switch module qm2f, which are connected to the V-phase are arranged as the single V-phase output switch row extended along the upper-to-lower direction (see also FIG. 15 and the like to be described later). Furthermore, the pair of the first switch module qm1g and the second switch module qm2g which are connected to the R-phase and the W-phase, the pair of the first switch module qm1h and the second switch module qm2h which are connected to the S-phase and the W-phase, and the pair of the first switch module qm1i and the second switch module qm2i which are connected to the T-phase and the W-phase are arranged along the upper-to-lower direction. As a result, the first switch module qm1g, the second switch module qm2g, the first switch module qm1h, the second switch module qm2h, the first switch module qm1i, and the second switch module qm2i, which are connected to the W-phase are arranged as the single W-phase output switch row extended along the upper-to-lower direction (see also FIG. 15 and the like to be described later).
(Specific Configuration of Matrix Converter)

Next, the specific configuration of the matrix converter 1' will be described referring to FIGS. 14, 15, and 16. Note that, FIGS. 14 to 16 may partially omit the connection lines among components of the matrix converter 1' to avoid cumbersome illustration.

As FIGS. 14 to 16 show, the matrix converter 1' includes the housing 110, the aforementioned wind tunnel 120, a main body 130', and the aforementioned main body case. The main body 130' includes the AC reactors L1-L3, the capacitor sections 20a-20c, the first switch modules qm1a- qm1$i$, the second switch modules qm2$a$-qm2$i$, and eighteen snubber modules sm. Note that, FIGS. 14 to 16 illustrate the matrix converter 1' for convenience of description so that the longitudinal direction of the housing 110, the width direction perpendicular to the longitudinal direction, and the depth direction perpendicular to both the longitudinal and width directions correspond to the upper-to-lower direction, the left-to-right direction, and the front-to-rear direction, respectively. In such a case, the upper-to-lower direction corresponds to the first direction, the left-to-right direction corresponds to the second direction, and the front-to-rear direction corresponds to the third direction.

The three heat sinks 190$a$, 190$b$, 190$c$ each including the base 191 and a plurality of fins 192 are attached to a base part of the housing 110 adjacently along the left-to-right direction so that those fins 192 are stored in the wind tunnel 120. Note that the number of the heat sinks attached to the base part of the housing 110 is not limited to three, but may be another number.

On the front surface of the base 191 of the left heat sink 190$a$, placed are the pair of the first switch module qm1$a$ and the second switch module qm2$a$, the pair of the first switch module qm1$b$ and the second switch module qm2$b$, and the pair of the first switch module qm1$c$ and the second switch module qm2$c$ along the upper-to-lower direction. As a result, the U-phase output switch row is formed on the front surface of the base 191 of the left heat sink 190$a$.

On the front surface of the base 191 of the center heat sink 190$b$, placed are the pair of the first switch module qm1$d$ and the second switch module qm2$d$, the pair of the first switch module qm1$e$ and the second switch module qm2$e$, and the pair of the first switch module qm1$f$ and the second switch module qm2$f$ along the upper-to-lower direction. As a result, the V-phase output switch row is formed on the front surface of the base 191 of the center heat sink 190$b$.

On the front surface of the base 191 of the right heat sink 190$e$, placed are the pair of the first switch module qm1$g$ and the second switch module qm2$g$, the pair of the first switch module qm1$h$ and the second switch module qm2$h$, and the pair of the first switch module qm1$i$ and the second switch module qm2$i$ along the upper-to-lower direction. As a result, the W-phase output switch row is formed on the front surface of the base 191 of the right heat sink 190$c$.

The wind tunnel 120 is configured to flow the refrigerant in the upper-to-lower direction. In other words, the fan 150 takes in air from the opening 112, and discharges the air at the upper end of the housing 110 so as to allow the refrigerant to flow through the wind tunnel 120 in the upper-to-lower direction (specifically, from the lower side to the upper side). Here, the fan 150 may take in air from the upper end of the housing 110, and discharge the air through the opening 112 so as to allow the refrigerant to flow through the wind tunnel 120 in the upper-to-lower direction (specifically, from the upper side to the lower side). Moreover, the refrigerant flow direction in the wind tunnel 120 is not limited to the upper-to-lower direction, but may be another direction (for example, left-to-right direction).

Likewise the embodiment as described above, the AC reactors L1-L3 are installed on the upper side of the heat sinks 190$a$-190$c$ of the wind tunnel 120 along the left-to-right direction, and connected to the R-phase, the S-phase, and the T-phase of the AC power supply 2 via the bus bar (not shown), respectively. That is, each of the AC reactors L1-L3 includes the aforementioned two terminals LT1, LT2. Each terminal LT1 of the AC reactors L1, L2, L3 is connected respectively to the terminal of the bus bar connected to the R-phase of the AC power supply 2, the terminal of the bus bar connected to the S-phase of the AC power supply 2, and the terminal of the bus bar connected to the T-phase of the AC power supply 2 through fastening with screws. Here, the AC reactors L1-L3 may be connected to the respective output phases of the AC power supply 2 via the cable. Moreover, the respective terminals LT2 of the AC reactors L1, L2, L3 are connected to each one end of the cables 50$a$, 50$b$, 50$c$ to be connected to the respective terminals 340A of the three bus bars 34 to be described later. Here, the AC reactors L1-L3 may be connected to the respective terminals 340A of the three bus bars 34.

As described above, each of the capacitor sections 20$a$-20$c$ includes five capacitors 21 which are electrically connected in parallel. The respective five capacitors 21 of the capacitor sections 20$a$-20$c$ are stored and supported in the capacitor case 22 extending in the left-to-right direction. Each of the capacitors 21 has a cylindrical shape in this example, and includes an input/output terminal t1, and a neutral point terminal tn connected to the neutral points N (see FIG. 12) of the wire connection to the capacitor sections 20$a$, -20$c$. The respective five capacitors 21 of the capacitor sections 20$a$-20$c$ are electrically connected to one another in parallel by connecting the terminals t1 to the bus bar 31 through fastening with screws. Further, the neutral point terminal tn of each of the capacitors 21 is connected to the bus bar 30 through fastening with the screw.

Each of the first switch modules qm1$a$-qm1$i$, and each of the second switch modules qm2$a$-qm2$i$ include two terminals qt11, qt12 at the left end, and two terminals qt13, qt14 at the right end, respectively.

Each of the eighteen snubber modules sm includes two input/output terminals t3$a$, t3$b$ which protrude from the side surface (left surface in this example), and is placed respectively on the corresponding one of the first switch modules qm1$a$-qm1$i$, and the second switch modules qm2$a$-qm2$i$. The respective input/output terminals t3$a$, t3$b$ of the eighteen snubber modules sm are connected to the respective terminals qt11, qt12 of the first switch modules qm1$a$-qm1$i$, and the second switch modules qm2$a$-qm2$i$. Further, the respective terminals qt11, qt12 of the first switch modules qm1$a$-qm1$i$, and the second switch modules qm2$a$-qm2$i$ are connected to the corresponding terminals provided on appropriate positions on a bus bar 32 to be connected to the discharge circuit (not shown), and fixed together with the respective input/output terminals t3$a$, t3$b$ of the eighteen snubber modules sm through fastening with screws. As a result, the respective switch modules qm and the respective snubber modules sm are connected, and the respective snubber modules sm and the discharge circuit are connected.

(Structure of Each Bus Bar)

In the present embodiment, the first switch module qm1 and the second switch module qm2 are connected via the three bus bars 33 (corresponding to the third bus bar), and the three bus bars 34 (corresponding to the fourth bus bar). Note that the first switch module qm1 and the second switch module qm2 may be connected via the bus bar with another configuration or the cable.

The respective bus bars 33 are arranged along the upper-to-lower direction and used for connecting the three first switch modules qm1 and the three second switch modules qm2, which are connected to one of the output phases. Each of the bus bars 33 includes a linear unit 330 extending in the upper-to-lower direction, and branch units 331, 332, 333, which are connected to the upper end, substantially the center, and the lower end of the linear unit 330, respectively.

A terminal 330A is provided on one end (the lower end in this example) of the linear unit 330.

The branch unit 331 includes a terminal 331a at one end (upper side in this example), and a terminal 331b at the other end (lower side in this example) which are branched in the direction in which the first switch module qm1 and the second switch module qm2 are arranged, that is, in the upper-to-lower direction. The branch unit 331 is branched and connected to the first switch module qm1 and the second switch module qm2 by those terminals 331a, 331b.

The branch unit 332 branched in the upper-to-lower direction into a terminal 332a at one end (upper side in this example), and a terminal 332b at the other end (lower side in this example). The branch unit 332 is branched and connected to the first switch module qm1 and the second switch module qm2 by those terminals 332a, 332b.

The branch unit 333 branched in the upper-to-lower direction into a terminal 333a at one end (upper end in this example), and a terminal 333b at the other end (lower side in this example). The branch unit 333 is branched and connected to the first switch module qm1 and the second switch module qm2 by those terminals 333a, 333b.

In the present embodiment, the branch units 331, 332, 333 are configured to be integrated with the linear unit 330. Note that the branch units 331, 332, 333 each as a member separated from the linear unit 330 may be detachably secured thereto. Each of the branch units 331, 332, 333 may have a shape symmetrical with respect to the upper-to-lower direction. Here, each of the branch units 331, 332, 333 may have a shape asymmetrical with respect to the upper-to-lower direction.

The respective bus bars 34 are arranged along the left-to-right direction and used for connecting the three first switch modules qm1 and the three second switch modules qm2, which are connected to one of the input phases. Each of the bus bars 34 includes a linear unit 340 extending in the left-to-right direction, and branch units 341, 342, 343 which are connected to the left end, substantially the center, the right end of the linear unit 340, respectively.

A terminal 340A is provided on one end (the right end in this example) of the linear unit 340. Further, the linear unit 340 includes terminals 344, 345, 346 which extend downward from the left end, substantially the center, and the right end, respectively.

The branch unit 341 is branched in the upper-to-lower direction into a terminal 341a at one side (upper side in this example), and a terminal 341b at the other side (lower side in this example). The branch unit 341 is branched and connected to the first switch module qm1 and the second switch module qm2 by those terminals 341a, 341b.

The branch unit 342 is branched in the upper-to-lower direction into a terminal 342a at one side (upper side in this example), and a terminal 342b at the other side (lower side in this example). The branch unit 342 is branched and connected to the first switch module qm1 and the second switch module qm2 by those terminals 342a, 342b.

The branch unit 343 is branched in the upper-to-lower direction into a terminal 343a at one side (upper side in this example), and a terminal 343b at the other side (lower side in this example). The branch unit 343 is branched and connected to the first switch module qm1 and the second switch module qm2 by those terminals 343a, 343b.

In the present embodiment, the branch units 341, 342, 343 as members separate from the linear unit 340 are detachably secured thereto with screws. Note that the branch units 341, 342, 343 may also be integrally formed with the linear unit 340. Further, each of the branch units 341, 342, 343 has a symmetrical shape with respect to the upper-to-lower direction. Here, each of the branch units 341, 342, 343 may have an asymmetrical shape with respect to the upper-to-lower direction.

(Connection Relationship Among Respective Components of Matrix Converter)

The respective terminals qt13 of the first switch modules qm1a, qm1d, qm1g are connected to the terminals 341a, 342a, 343a of the bus bar 34, which are connected to the terminal LT2 of the AC reactor L1 via the terminal 340A and the cable 50a through fastening with screws. The respective terminals qt13 of the second switch modules qm2a, qm2d, qm2g are connected to the terminals 341b, 342b, 343b of the bus bar 34 through fastening with screws. As a result, the first switch modules qm1a, qm1d, qm1g, and the second switch modules qm2a, qm2d, qm2g, which are connected to the R-phase, are connected. Likewise, the respective terminals qt13 of the first switch modules qm1b, qm1e, qm1h are connected to the bus bar 34 which is connected to the terminal LT2 of the AC reactor L2 via the terminal 340A and the cable 50b. Likewise, the respective terminals qt13 of the second switch modules qm2b, qm2e, qm2h are connected to the bus bar 34 as well. As a result, the first switch modules qm1b, qm1e, qm1h, and the second switch modules qm2b qm2e, qm2h, which are connected to the S-phase, are connected. Likewise, the respective terminals qt13 of the first switch modules qm1c, qm1f, qm1i are connected to the bus bar 34 which is connected to the terminal LT2 of the AC reactor L3 via the terminal 340A and the cable 50c. Likewise, the respective terminals qt13 of the second switch modules qm2c, qm2f, qm2i are connected to the bus bar 34. As a result, the first switch modules qm1c, qm1f, qm1i, and the second switch modules qm2c, qm2f, qm2i, which are connected to the T-phase, are connected.

The three bus bars 31 each connected to the five capacitors 21 are placed on the terminals 344, 345, 346 of the three bus bars 34, respectively through fastening with screws. As a result, the fifteen capacitors 21 are laminated and arranged on the first switch module qm1 and the second switch module qm2 in the front-to-rear direction. In other words, the terminals 344, 345, 346 correspond to placing units. Here, in place of the bus bar 34, or in addition thereto, the bus bar 33 may be configured to allow the capacitor 21 to be placed. Alternatively, either the bus bar 34 or 33 is not configured to have the capacitor 21 placed, but may be configured to have an additional member for supporting the capacitor 21.

Further, the respective terminals qt14 of the first switch modules qm1a, qm1b, qm1c are connected to the terminal 331a of the bus bar 33 connected to the U-phase of the load 4 via the terminal 330A respectively through fastening with screws. The respective terminals qt14 of the second switch modules qm2a, qm2b, qm2c are connected to the terminal 331b of the bus bar 33 respectively through fastening with screws. As a result, the first switch modules qm1a, qm1b, qm1c, and the second switch modules qm2a, qm2b, qm2c, which are connected to the U-phase, are connected. Likewise, the respective terminals qt14 of the first switch modules qm1d, qm1e, qm1f are connected to the bus bar 33 which is connected to the V-phase of the load 4 via the terminal 330A. Likewise, the respective terminals qt14 of the second switch modules qm2d, qm2e, qm2f are connected to the bus bar 33. As a result, the first switch modules qm1d, qm1e, qm1f, and the second switch modules qm2d, qm2e, qm2f, which are connected to the V-phase, are connected. Likewise, the respective terminals qt14 of the first switch modules qm1g, qm1h, qm1i are connected to the bus bar 33 which is connected to the W-phase of the load 4 with the terminal 330A. The respective terminals qt14 of the second switch modules qm2g, qm2h, qm2i are connected to the bus bar 33. As a result, the first switch modules qm1g, qm1h, qm1i, and the second switch modules qm2g, qm2h, qm2i, which are connected to the W-phase, are connected.

(Effect of the Present Embodiment)

As described above, the matrix converter 1' of the present embodiment includes the plurality of first bidirectional switches q1 connected to the input phase of the AC power supply 2 and the output phase of the load 4, respectively, and the plurality of second bidirectional switches q2 which is electrically connected to the input phase and the output phase which are the same as those connected to the first bidirectional switches q1 in parallel thereto. The matrix converter 1' converts the AC power of the AC power supply 2 into the AC power at arbitrary voltage and frequency, and outputs the power to the load 4 by performing the switching operation of the first bidirectional switch q1 and the second bidirectional switch q2.

Here, the applicable rated current is determined for each of the bidirectional switches q. The rated current of the matrix converter 1' cannot be increased beyond the rated current of the bidirectional switch q, which may restrict increase in the capacity of the matrix converter 1'.

In the present embodiment, the plurality of bidirectional switches q is connected in parallel with respect to the respective input phases of the AC power supply 2 and the respective output phases of the load 4. As a result, since the current flowing through the respective bidirectional switches q may be reduced (for example, if two switches are connected in parallel, the current flowing through one of the bidirectional switches q may be reduced by half), it is possible to significantly increase the rated current of the matrix converter 1' while suppressing the current flowing through the bidirectional switch q to be within the rated current value. Therefore, it is possible to realize the matrix converter 1' with the large capacity.

Further, especially in the present embodiment, the first bidirectional switches q1 and the second bidirectional switches q2 which are connected to the same input and output phases are adjacently arranged. As a result, it is possible to shorten the wiring (the respective branch units of the bus bars 33, 34) for connecting the first bidirectional switch q1 and the second bidirectional switch q2 in parallel, and to simplify wiring structure.

Furthermore, especially in the present embodiment, the plurality of first bidirectional switches q1 and the plurality of second bidirectional switches q2 which are connected to one of the output phases are arranged as the single switch row extended along the upper-to-lower direction. As a result, it is possible to reduce the dimension of the matrix converter 1' in the width direction.

Moreover, especially in the present embodiment, the wind tunnel 120 is configured to allow the refrigerant to flow in the upper-to-lower direction. As a result, in the wind tunnel 120, the refrigerant flows in a direction perpendicular to the left-to-right direction in which the plurality of first bidirectional switches q1 and the plurality of second bidirectional switches q2, which are connected to one of the input phases (R-phase, S-phase, or T-phase) are arranged. As a result, since the heat of the respective bidirectional switches q may be uniformly transferred by the heat sinks 190a-190c with respect to the refrigerant flow direction, it is possible to improve cooling efficiency.

In addition, especially in the present embodiment, the matrix converter 1' includes the bus bar 33 arranged along the upper-to-lower direction, and the bus bar 34 arranged along the left-to-right direction. The bus bar 33 includes the linear unit 330 having the terminal 330A connected to the load 4 side at the lower end, and the plurality of branch units 331, 332, 333 branched and connected to the first bidirectional switch q1 and the second bidirectional switch q2 so as to connect one of the output phases (U-phase, V-phase, or W-phase) and the plurality of the first bidirectional switches q1 and the plurality of second bidirectional switches q2. Further, the bus bar 34 includes the linear unit 340 having the terminal 340A connected to the AC power supply 2 side at the right end, and the plurality of branch units 341, 342, 343 so as to connect one of the input phases (R-phase, S-phase, or T-phase) and the plurality of first bidirectional switches q1 and the plurality of second bidirectional switches q2. As described above, the wiring structure using the bus bars 33, 34 allows enhancement of the wiring rigidity. As a result, deviation of the wiring or damage thereto resulting from oscillation may be lessened. Further, the bus bars 33, 34 are allowed to serve as the support members for supporting other components.

Additionally, especially in the present embodiment, each of the branch units 331, 332, 333 of the bus bar 33, and each of the branch units 341, 342, 343 of the bus bar 34 may have a symmetrical shape with respect to the direction in which the first bidirectional switch q1 and the second bidirectional switch q2 are arranged. As a result, each impedance at the first bidirectional switch q1 side may be made substantially the same as those at the second bidirectional switch q2 side in the branch units 331, 332, 333 and 341, 342, 343, respectively. It is possible to prevent the current of both switches from being unbalanced.

Further, especially in the present embodiment, the branch units 341, 342, 343 of the bus bar 34, which are formed separately from the linear unit 340 are detachably secured thereto. By forming the branch units 341, 342, 343 separately from the linear unit 340, the waste part of the copper plate generated upon formation of the bus bar 34 may be reduced compared with the integrated structure. Moreover, as the branch units 341, 342, 343 are formed detachably from the linear unit 340, only the linear unit 340 is allowed to be removed in the state where the branch units 341, 342, 343 are kept in connection with the bidirectional switches q, resulting in improved maintenance property.

Furthermore, especially in the present embodiment, the terminals 344, 345, 346 of the bus bar 34 are configured to allow the capacitor 21 to be placed thereon. As a result, since the capacitor 21 may be laminated and arranged on the first bidirectional switch q1 and the second bidirectional switch q2 in the front-to-rear direction, it is possible to shorten the wiring distance between the bidirectional switch q and the capacitor 21, thus reducing the wiring inductance. Moreover, it is also possible to reduce the dimension of the matrix converter 1' both in the upper-to-lower direction and in the left-to-right direction to realize the compact structure. Furthermore, the bus bar 34 is allowed to serve as the support member for the capacitor 21, thus reducing both the number of components and the cost.

<Modified Example>

Note that the second embodiment is not limited to the structure as described above, but may be modified in various forms so long as it does not deviate from the scope and the technical idea of the disclosure.

As have been described with respect to the first and the second embodiments, it is to be understood that connection relationship between the first bidirectional switch and the second bidirectional switch is not limited to the one as described in the first and the second embodiments. In other words, arbitrary connection relationship between the first and the second bidirectional switches may be implemented so long as the plurality of first bidirectional switches is connected to the input phase of the AC power supply 2 and to the output phase of the load 4, and the plurality of second bidirectional switches is electrically connected to the same input and output phases as those connected to the first bidirectional switches in parallel thereto.

Note that, in explanations made as above, such terms as "perpendicular", "parallel", "plane" are used in the less strict sense. That is, the "perpendicular", "parallel", "plane" refer to "substantially perpendicular", "substantially parallel", "substantially plane" which allow the tolerance or error in designing and manufacturing.

It is noted that if terms "same," "equal," "different," etc. in relation to a dimension and a size of the appearance are used in the above description, these terms are not used in the exact meaning thereof. Specifically, these terms "same," "equal," and "different" allow tolerances and errors in design and manufacturing and have meanings of "approximately the same," "approximately equal," and "approximately different."

Techniques by the embodiment and each modified example may be appropriately combined and utilized in addition to the examples having already described above.

Although exemplification is not performed one by one, the embodiment and each modified example are carried out by various changes being applied thereto without departing from the technical idea of the present disclosure.

What is claimed is:

1. A matrix converter comprising:
a plurality of first bidirectional switches electrically connected to each of input phases of an AC power supply and each of output phases of a load, respectively;
a plurality of second bidirectional switches electrically connected to each of the input phases and each of the output phases, respectively; and
a heat sink on which the first bidirectional switches and the second bidirectional switches are disposed;
the first bidirectional switch and the second bidirectional switch being electrically connected in parallel to one of the input phases and one of the output phases,
wherein the plurality of first bidirectional switches and the plurality of second bidirectional switches, which are connected to one of the output phases, are arranged in a single switch row extended along a first direction on the heat sink, and
wherein the single switch row connected to the one of the output phases and another single switch row connected to another of the output phases are arranged in parallel along a second direction perpendicular to the first direction.

2. The matrix converter according to claim 1,
wherein the plurality of second bidirectional switches comprise one or more groups each comprising a same number of the second bidirectional switches as a number of the plurality of first bidirectional switches.

3. The matrix converter according to claim 2,
wherein the plurality of first bidirectional switches are arranged in a unified manner, and
wherein the plurality of second bidirectional switches are arranged collectively for each of the groups.

4. The matrix converter according to claim 3,
wherein the plurality of first bidirectional switches connected to each of the input phases are adjacently arranged for each of the output phases, and wherein the plurality of second bidirectional switches connected to each of the input phases are adjacently arranged for each of the output phases in each of the groups.

5. The matrix converter according to claim 4, further comprising:
a wind tunnel configured to store fins for the heat sink and allow a refrigerant to flow in a direction parallel to the first direction.

6. The matrix converter according to claim 4, further comprising
a capacitor module configured to store, in a single module cover, a plurality of AC capacitors corresponding to the plurality of first bidirectional switches arranged adjacently or the plurality of second bidirectional switches arranged adjacently.

7. The matrix converter according to claim 6,
wherein the capacitor module comprises a plurality of terminals protruding from a bottom surface of the module cover, and is installed in a self-standing manner on the plurality of first bidirectional switches arranged adjacently or the plurality of second bidirectional switches arranged adjacently.

8. The matrix converter according to claim 7,
wherein the module cover stores, at positions further on a bottom surface side rather than where the plurality of AC capacitors are disposed, a plurality of snubber capacitors corresponding to the plurality of first bidirectional switches arranged adjacently or the plurality of second bidirectional switches arranged adjacently.

9. The matrix converter according to claim 6,
wherein the capacitor module comprises a neutral point terminal disposed on a side surface of the module cover and connected to a neutral point of a wire connection of the plurality of AC capacitors, and
the matrix converter further comprises
a first bus bar connected to the neutral point terminals among the plurality of capacitor modules.

10. The matrix converter according to claim 6,
wherein the module cover is made of a resin material.

11. The matrix converter according to claim 1, further comprising
a second bus bar which is connected to a input phase side of the first bidirectional switch and the second bidirectional switch, and is formed by laminating plate conductors connected to each of the input phases and insulating sheets.

12. The matrix converter according to claim 1, further comprising:
a first signal wiring for connecting a gate driving circuit and each of the plurality of first bidirectional switches; and
a second signal wiring for connecting the gate driving circuit and each of the plurality of second bidirectional switches,
wherein the first signal wiring for the first bidirectional switch and the second signal wiring for the second bidirectional switch have the same length, the first bidirectional switch and the second bidirectional switch being electrically connected in parallel to the same input phase and the same output phase.

13. The matrix converter according to claim 1,
wherein the first bidirectional switch and the second bidirectional switch, which are connected to the same input phase and the same output phase, are adjacently arranged.

14. A matrix converter comprising:
a plurality of first bidirectional switches electrically connected to each of input phases of an AC power supply and each of output phases of a load, respectively; and
a plurality of second bidirectional switches electrically connected to each of the input phases and each of the output phases, respectively,
the first bidirectional switch and the second bidirectional switch being electrically connected in parallel to one of the input phases and one of the output phases,
wherein the first bidirectional switch and the second bidirectional switch, which are connected to the same input phase and the same output phase, are adjacently arranged,
wherein the plurality of first bidirectional switches and the plurality of second bidirectional switches, which are connected to one of the output phases, are arranged in a single switch row extended along a first direction,
wherein the matrix converter further comprises:
a heat sink on which the first bidirectional switch and the second bidirectional switch are disposed; and
a wind tunnel configured to store fins for the heat sink and allow a refrigerant to flow in a direction parallel to the first direction.

15. The matrix converter according to claim 1, further comprising:
a plurality of third bus bars which is arranged along the first direction and connects the plurality of first bidirectional switches and the plurality of second bidirectional switches, the first bidirectional switch and the second bidirectional switch being connected to one of the output phases; and
a plurality of fourth bus bars which is arranged along a second direction perpendicular to the first direction and connects the plurality of first bidirectional switches and the plurality of second bidirectional switches, the first bidirectional switch and the second bidirectional switch being connected to one of the input phases,
wherein each of the third bus bar and the fourth bus bar comprises
a linear unit comprising a terminal at one end, and
a plurality of branch units which is coupled to the linear unit, and is branched and connected to the first bidirectional switch and the second bidirectional switch.

16. The matrix converter according to claim 15,
wherein the branch unit has a symmetrical shape with respect to a direction in which the first bidirectional switch and the second bidirectional switch are arranged.

17. The matrix converter according to claim 15,
wherein the branch unit is a separate unit from the linear unit, and is detachably secured to the linear unit.

18. The matrix converter according to claim 15,
wherein at least one of the third bus bar and the fourth bus bar comprises a plurality of placing units each configured to place a capacitor at a position further on a third direction side rather than where the first bidirectional switch and the second bidirectional switch are disposed, the third direction being perpendicular to the first direction and the second direction.

* * * * *